(12) United States Patent
Suver

(10) Patent No.: US 9,388,548 B2
(45) Date of Patent: Jul. 12, 2016

(54) APPARATUS AND METHODS FOR PIPE PILING PLACEMENT

(71) Applicant: American Piledriving Equipment, Inc., Kent, WA (US)

(72) Inventor: Paul W. Suver, Seattle, WA (US)

(73) Assignee: American Piledriving Equipment, Inc., Kent, WA (US)

( * ) Notice: Subject to any disclaimer, the term of this patent is extended or adjusted under 35 U.S.C. 154(b) by 124 days.

(21) Appl. No.: 13/917,132

(22) Filed: Jun. 13, 2013

(65) Prior Publication Data

US 2014/0056652 A1    Feb. 27, 2014

Related U.S. Application Data

(63) Continuation-in-part of application No. 13/594,839, filed on Aug. 26, 2012.

(60) Provisional application No. 61/831,554, filed on Jun. 5, 2013, provisional application No. 61/831,535, filed on Jun. 5, 2013, provisional application No. 61/528,116, filed on Aug. 26, 2012.

(51) Int. Cl.
*E02D 7/22* (2006.01)
*E02D 7/26* (2006.01)
*F16L 23/00* (2006.01)

(52) U.S. Cl.
CPC .. *E02D 7/22* (2013.01); *E02D 7/26* (2013.01); *F16L 23/00* (2013.01)

(58) Field of Classification Search
CPC ............. E02D 5/52; E02D 5/801; E02D 7/06; E02D 27/16; E02D 5/48; E02D 5/523; E02D 5/74; E02D 5/56; E02D 7/22; E02D 5/22; E02D 7/02; E02D 11/00; E02D 7/28; E02D 13/00; E02D 5/24; E02D 5/526; E02D 5/54; E02D 5/80; E02D 27/12; E02D 27/14
USPC ................. 405/231, 232, 244, 249, 250, 251, 405/252.1, 252, 253, 254
See application file for complete search history.

(56) References Cited

U.S. PATENT DOCUMENTS 2,584,015 A * 1/1952 Hawes ...................... E04G 5/02
                                                    182/182.1
3,345,826 A * 10/1967 Hignite ................... E02D 5/385
                                                    166/240

(Continued)

OTHER PUBLICATIONS

Forney 75532 Brass Fitting, Hose Coupling, ¼—Inch Female NPT to ¼-Inch Female NPT. Amazon.com. Jul. 24, 2010 [Retrieved Nov. 4, 2013]. Retrieved from internet: http://www.amazon.com/Forney=75532-Fitting-Coupling-4-Inch/dp/B003X5Q8BE entire document.

*Primary Examiner* — Benjamin Fiorello
*Assistant Examiner* — Edwin Toledo-Duran
(74) *Attorney, Agent, or Firm* — Madson IP, P.C.

(57) ABSTRACT

A pipe assembly may have one or more pipe segments that are coupled together or coupled to a drive socket by a coupler. The coupler may have a body with a generally tubular shape with an interior surface and an exterior surface. First and second flanges may extend outward from the exterior surface to engage the drive socket, thereby providing enhanced stability and coaxiality. The interior surface may have an upper receiving feature that can receive the bottom end of an overhead pipe segment, and a lower receiving feature that can receive the top end of a subtending pipe segment. The upper receiving feature may have an upper threaded bore with a lead-in portion that facilitates alignment of the overhead pipe segment with the upper threaded bore. The interior surface may also have a stop feature that prevents over-insertion of the top end and/or the bottom end into the coupler.

20 Claims, 20 Drawing Sheets

(56) References Cited

U.S. PATENT DOCUMENTS

| | | | | |
|---|---|---|---|---|
| 3,354,657 A | * | 11/1967 | Turzillo | E02D 5/62 405/244 |
| 3,452,830 A | * | 7/1969 | Mastropole | E02D 7/18 175/55 |
| 4,484,638 A | * | 11/1984 | West | B21J 7/28 173/200 |
| 4,614,462 A | * | 9/1986 | Itou | E02D 7/22 173/145 |
| 4,668,119 A | * | 5/1987 | Galletti | E02D 5/285 403/343 |
| 4,790,571 A | * | 12/1988 | Montanari | F16L 37/133 285/315 |
| 5,018,905 A | * | 5/1991 | Kinder | E02D 35/00 405/230 |
| 5,310,287 A | * | 5/1994 | Arentsen | E02D 11/00 405/232 |
| 5,355,964 A | * | 10/1994 | White | E02D 7/18 173/1 |
| 5,785,357 A | * | 7/1998 | Foster | F16L 15/08 285/322 |
| 5,813,800 A | * | 9/1998 | Doleshal | E02D 5/64 405/232 |
| 5,919,005 A | * | 7/1999 | Rupiper | B09C 1/00 175/323 |
| 5,934,836 A | * | 8/1999 | Rupiper | B09C 1/00 405/236 |
| 5,975,808 A | * | 11/1999 | Fujita | E02D 5/28 405/244 |
| 6,234,260 B1 | * | 5/2001 | Coast | G01V 1/16 173/148 |
| 6,386,295 B1 | * | 5/2002 | Suver | E02F 3/962 173/1 |
| 6,641,332 B1 | * | 11/2003 | Alvarado | E02D 5/28 175/323 |
| 6,942,430 B1 | * | 9/2005 | Suver | E02D 5/56 405/232 |
| 7,146,704 B2 | * | 12/2006 | Otten | F16L 15/08 285/330 |
| 7,494,299 B1 | | 2/2009 | Whitsett | |
| 7,950,876 B2 | * | 5/2011 | Suver | E02D 5/38 405/232 |
| 2005/0201836 A1 | * | 9/2005 | Suver | 405/232 |
| 2008/0106433 A1 | * | 5/2008 | Madhavan | E21B 17/003 340/854.4 |
| 2008/0157521 A1 | * | 7/2008 | Davis | E21B 17/046 285/331 |
| 2011/0158752 A1 | * | 6/2011 | Hitchin | E02D 5/385 405/232 |

\* cited by examiner

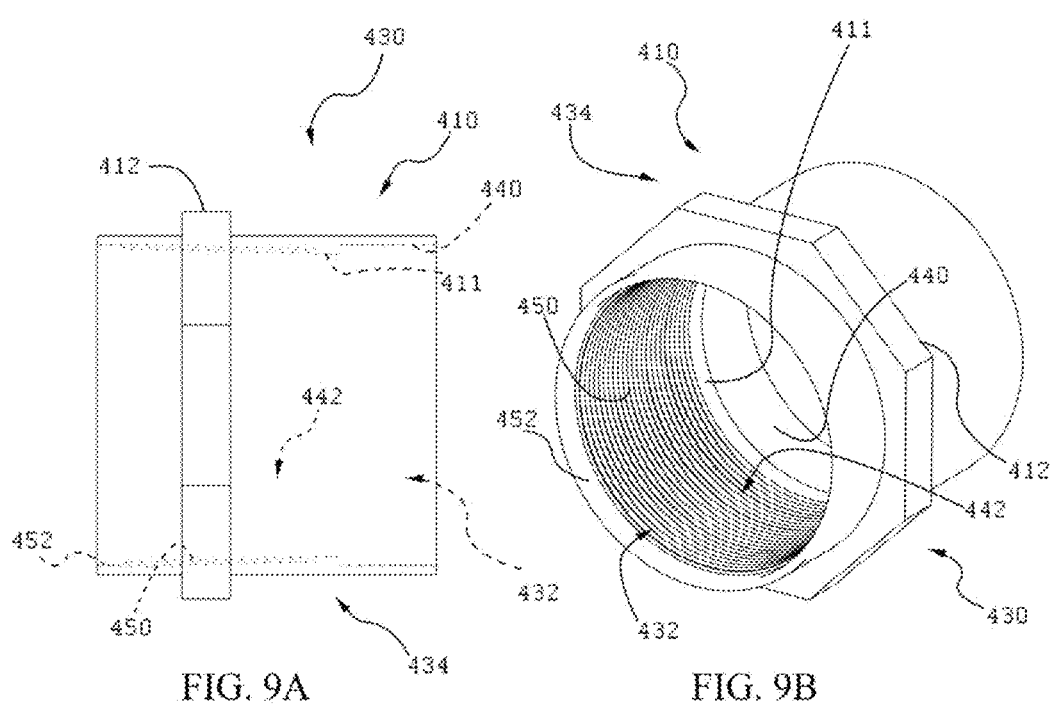

APPARATUS AND METHODS FOR PIPE PILING PLACEMENT

RELATED APPLICATIONS

This application is a continuation-in-part of U.S. patent application Ser. No. 13/594,839, filed on Aug. 26, 2012 and entitled APPARATUS AND METHODS FOR THE PLACEMENT OF PIPE PILING. This application also claims benefit of priority to U.S. Provisional Patent Application No. 61/831,554, filed Jun. 5, 2013, U.S. Provisional Patent Application No. 61/831,535, filed Jun. 5, 2013, U.S. Provisional Patent Application No. 61/528,116, filed Aug. 26, 2012, and U.S. Provisional Patent Application No. 61/660,292, filed Jun. 15, 2012, which are incorporated by reference as if fully set forth herein. This application is related to U.S. Pat. No. 6,386,295 filed Mar. 10, 2000; U.S. Pat. No. 6,942,430 filed Mar. 10, 2004; and U.S. Pat. No. 7,950,876 filed Oct. 21, 2008, and all three patents are hereby incorporated by reference as if fully set forth herein.

FIELD OF THE DISCLOSURE

This disclosure relates to the placement of pilings, and in particular pipe pilings, in the ground to act as structural supports, geothermal piles, or both. In addition to specialized fittings for pipe pile assemblies, the disclosure includes specialized drive mechanisms used in conjunction with rotary or vibratory motors. Methods of installing pipe pilings are improved with the disclosure of methods of adding grout or similar materials during or after installation of the piles.

BACKGROUND OF THE DISCLOSURE

U.S. Pat. No. 6,386,295 and U.S. Pat. No. 6,942,430, which are incorporated here by reference, disclosed the use of vibratory and rotary drivers for the installation of pipe piling. Pipe piles, as used in the installation of structural foundations or geothermal piles, are segments of pipe that must be connected and driven together from the surface to reach the desired depth. Consequently, whether used in connection with vibratory or rotary drivers, the connection between pipe pile segments is vitally important to maximizing the driving power and reducing the possibility of failure of the pipe segment connection points. As the length of the column increases, weaknesses in the junctions between the pipe pile segments weaken the entire column, making it important to limit movement in the junctions.

Thus, prior art methods that require the use of bolts through pipe piles and connectors may lead to high stresses, and hence the risk of mechanical failure, for example, by shearing of the bolt. Where such fasteners are not used, known pipe coupling systems may have other drawbacks. For example, the torque applied to the coupled joint may cause over-threading of the pile and associated coupler, leading to high stresses, improper attachment, and potentially, mechanical failure of the joint.

While it is generally acknowledged that installation of pipe pilings is improved in stability and/or strength when installed with grout or similar material along the exterior of the column, prior art methods, including those disclosing push-out tips, are limited by the actual ability to push out the tip at the bottom of the column, or by difficulty in handling the grout during installation.

The citation of documents herein is not to be construed as reflecting an admission that any is relevant prior art. Moreover, their citation is not an indication of a search for relevant disclosures. All statements regarding the date(s) or contents of the documents is based on available information and is not an admission as to their accuracy or correctness.

BRIEF SUMMARY OF THE DISCLOSURE

The various systems and methods of the present disclosure have been developed in response to the present state of the art, and in particular, in response to the problems and needs in the art that have not yet been fully solved by currently available systems and methods. Thus, it is advantageous to provide systems and methods that provide reliable pipe pile assemblies in a wide variety of situations. Further, it is advantageous to minimize manufacturing and installation costs. The present disclosure may have other benefits that are not specifically set forth herein, but such other benefits will be understood by those skilled in the art once armed with this disclosure.

To achieve the foregoing, and in accordance with the disclosure as embodied and broadly described herein, a coupler may include a body having a generally tubular shape having an axis, the body having an exterior surface and an interior surface, the interior surface having a lower receiving feature shaped to receive a top end of a subtending pipe segment. The coupler may also have a first flange secured to the exterior surface, wherein the first flange extends generally perpendicular to the axis, the first flange having a first noncircular shape insertable into a drive socket to enable the drive socket to transmit rotation about the axis to the body through the first flange. The coupler may also have a second flange secured to the exterior surface, wherein the second flange extends generally perpendicular to the axis, the second flange having a second shape that is aligned with the first noncircular shape such that the second shape is also insertable into the drive socket to enable the drive socket to transmit rotation about the axis to the body through the second flange. The first and second flanges may be spaced apart from each other. The combination of the first and second flanges, as described, assures that the drive socket engages the first and second flanges in a non-binding axial alignment so that the efficiency of the rotational drive imparted by the drive socket is maximized.

The first noncircular shape may be an equilateral polygon, and the second shape is substantially identical to the first noncircular shape. The lower receiving feature may have a lower smooth bore shaped to receive a smooth exterior surface of the top end of the subtending pipe segment. Alternatively, the lower receiving feature may have a lower threaded bore shaped to receive a threaded exterior surface of the top end of the subtending pipe segment.

The interior surface may further have an upper receiving feature shaped to receive a bottom end of an overhead pipe segment. The upper receiving feature may have an upper threaded bore shaped to receive a threaded exterior surface of the bottom end of the overhead pipe segment. The upper receiving feature may further have a lead-in portion above the upper threaded bore. The lead-in portion may have an upper smooth bore having a length along the axis that is equal to or greater than a length along the axis of two threads of the upper threaded bore. A lead-in portion length of four threads along the axis is used in an exemplary embodiment to provide lead-in stability and placement accuracy when inserting the overhead pipe segment into the upper receiving feature. The interior surface may further have a stop feature positioned to prevent insertion of the bottom end of the overhead pipe segment beyond a lower boundary of the upper receiving feature. The stop feature may be a shoulder formed as a single piece with the body. The shoulder may have a generally annular shape with an inside diameter smaller than a minimum inside diameter of the upper threaded bore.

According to one method for penetrating soil with a pipe assembly, the method may include coupling a top end of a subtending pipe segment to a coupler, the coupler having a body having a generally tubular shape having an axis, the body comprising an exterior surface and an interior surface, the interior surface comprising a lower receiving feature, wherein coupling the top end of the subtending pipe segment to the coupler comprises receiving the top end of the subtending pipe segment in the lower receiving feature. The method may further include engaging the coupler with a drive socket, the coupler further having a first flange and a second flange spaced apart from the first flange, wherein the each of the first and second flanges extends generally perpendicular to the axis. The first flange and/or the second flange may be secured to the exterior surface of the body or may be formed unitarily (i.e., integrally) with the body. Engaging the coupler with the drive socket may include inserting the first flange into the drive socket such that the first flange engages the drive socket, and, after insertion of the first flange into the drive socket, inserting the second flange into the drive socket such that the second flange engages the drive socket. The method may further include rotating the subtending pipe segment by transmitting rotation from the drive socket to the coupler via the first and second flanges, and from the coupler to the subtending pipe segment.

The subtending pipe segment may be the bottom pipe segment in the pipe assembly, and may have a soil-penetrating tip and a helical flange extending outward from the axis. The method may further include urging the subtending pipe segment downward in response to rotation of the helical flange within the soil.

The lower receiving feature of the coupler may include a lower smooth bore. Coupling the coupler may include sliding a smooth exterior surface of the top end of the subtending pipe segment into the lower smooth bore of the lower receiving feature. In this case, the coupler can be secured to the top end of the subtending pipe segment by welding or any other suitable method that would cause the coupler to rotate synchronously with the subtending pipe segment. Alternatively, the lower receiving feature may include a lower threaded bore. Coupling the coupler may include threading a threaded exterior surface of the top end of the subtending pipe segment into the lower threaded bore.

The interior surface of the coupler may further have an upper receiving feature with an upper threaded bore. The method may further include, after rotation of the subtending pipe segment, removing the second flange from the drive socket and, after removing the second flange from the drive socket, removing the first flange from the drive socket. The method may further include threading a threaded exterior surface of a bottom end of an overhead pipe segment into the upper threaded bore. The upper receiving feature may further include a lead-in portion above the upper threaded bore. The lead-in portion may have an upper smooth bore having a length along the axis that is equal to or greater than a length along the axis of two threads of the upper threaded bore.

The method may further include, prior to threading the threaded exterior surface of the bottom end of the overhead pipe segment into the upper threaded bore, inserting threaded exterior surface of the bottom end into the upper smooth bore of the lead-in portion. This axially aligns the overhead pipe segment with the coupler to facilitate the threaded engagement between the threaded exterior surface of the bottom end into the upper threaded bore of the coupler.

The interior surface may have a stop feature. Threading the threaded exterior surface of the bottom end of the overhead pipe segment into the upper threaded bore may include abutting the stop feature with the bottom end of the overhead pipe segment to prevent insertion of the bottom end of the overhead pipe segment beyond a lower boundary of the upper receiving feature.

A system for penetrating soil with a pipe assembly may include a subtending pipe segment with a top end, a drive socket, a drive motor assembly coupled to the drive socket to urge rotation of the drive socket, and a coupler. The coupler may have a body with a generally tubular shape having an axis, the body comprising an exterior surface and an interior surface, the interior surface comprising a lower receiving feature. The coupler may further have a first flange secured to the exterior surface, wherein the first flange extends generally perpendicular to the axis, the first flange having a first noncircular shape. The coupler may further have a second flange secured to the exterior surface, wherein the second flange extends generally perpendicular to the axis, the second flange having a second shape which may be circular, noncircular, or substantially identical to the first noncircular shape of the first flange. The lower receiving feature may be shaped to receive the top end of the subtending pipe segment. The first and second flanges may be spaced apart from each other. The drive socket may be shaped to receive the first flange and the second flange such that rotation of the drive socket is transmitted to the body through the first and second flanges.

The subtending pipe segment may be the bottom pipe segment in a pipe assembly, and may have a soil-penetrating tip and a helical flange extending outward from the axis to urge the subtending pipe segment downward in response to rotation of the helical flange within the soil. The system may further have an overhead pipe segment with a bottom end having a threaded exterior surface. The interior surface may further have an upper receiving feature with an upper threaded bore shaped to receive the threaded exterior surface of the overhead pipe segment.

The upper receiving feature may further have a lead-in portion above the upper threaded bore. The lead-in portion may have an upper smooth bore having a length along the axis that is equal to or greater than a length along the axis of two threads of the upper threaded bore. The interior surface may further have a stop feature positioned to prevent insertion of the bottom end of the overhead pipe segment beyond a lower boundary of the upper receiving feature.

BRIEF DESCRIPTION OF THE FIGURES

FIGS. 9A and 9B are side elevation and perspective views, respectively, showing one embodiment of the coupler.

DETAILED DESCRIPTION OF MODES OF PRACTICING THE DISCLOSURE

Exemplary embodiments of the present disclosure will be best understood by reference to the drawings, wherein like parts are designated by like numerals throughout. It will be readily understood that the components of the present disclosure, as generally described and illustrated in the Figures herein, could be arranged and designed in a wide variety of different configurations. Thus, the following more detailed description of the embodiments of the apparatus, system, and method of the present disclosure, as represented in FIGS. 1 through 20, is not intended to limit the scope of the invention, as claimed, but is merely representative of exemplary embodiments.

The phrases "connected to," "coupled to" and "in communication with" refer to any form of interaction between two or more entities, including mechanical, electrical, magnetic, electromagnetic, fluid, and thermal interaction. Two components may be coupled to each other even though they are not in direct contact with each other. The term "abutting" refers to items that are in direct physical contact with each other, although the items may not necessarily be attached together. The phrase "fluid communication" refers to two features that are connected such that a fluid within one feature is able to pass into the other feature. "Exemplary" as used herein means serving as a typical or representative example or instance, and does not necessarily mean special or preferred.

Figure 1:
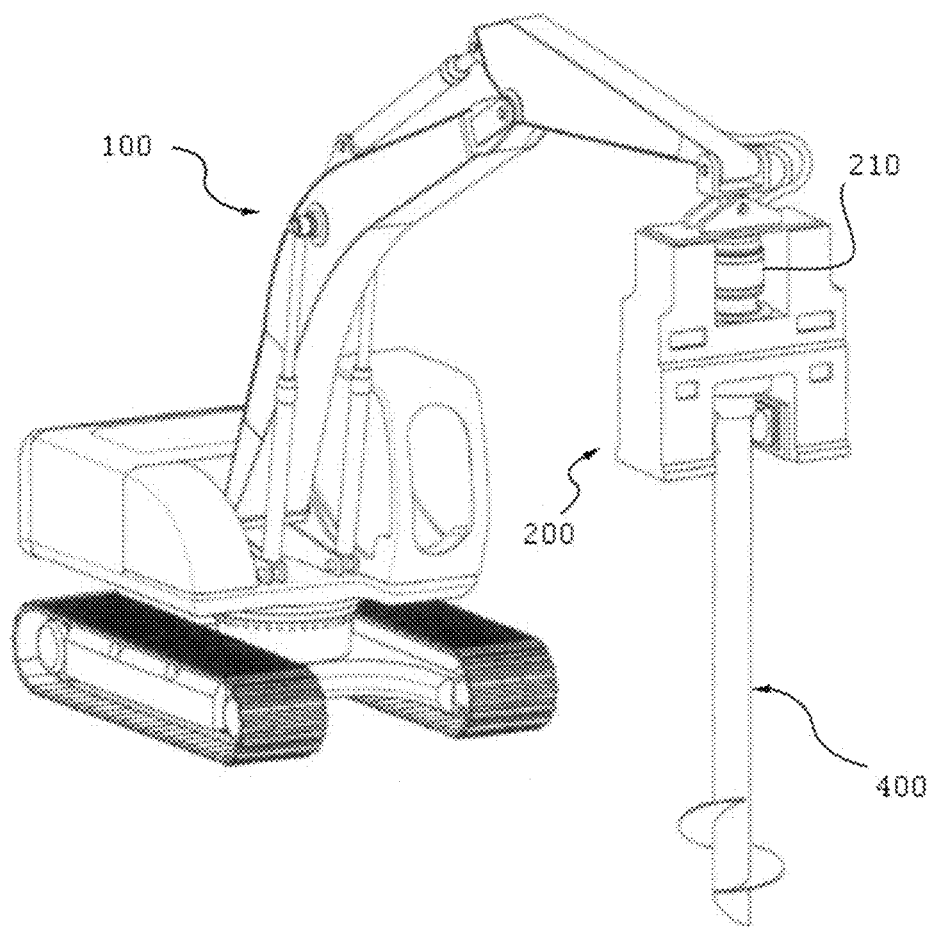
FIG. 1 is a perspective view showing a pile driver head suspended from an articulated boom attached to a movable base. A pipe assembly is attached to and suspended from the driver head.

Referring to FIG. 1, a drive motor assembly 210 may be contained within motor casing 200. The motor casing 200 may be suspended from a movable boom 100. The movable boom 100 may on a backhoe, mobile crane, gantry, or other apparatus capable of suspending the motor casing 200 at the desired height and/or position above the ground.

A pipe assembly 400 may be attached to and suspended from the motor casing 200. The pipe assembly 400 may include not only the pipe segment shown in FIG. 1, but may include additional pipe segments, couplers, fittings, and/or other elements needed to enable the desired depth of penetration, stability, and function. Examples of the movable boom 100 and motor casing 200, together with a detailed description of the drive motor assembly 210, can be found in U.S. Pat. No. 6,386,295 or U.S. Pat. No. 6,942,430, which are incorporated herein by reference. The drive motor assembly 210 may, in the alternative, be attached to a carriage (not shown) that may be movable up and down along a portable tower. Particulars of an exemplary movable tower and carriage can be found in U.S. Pat. No. 7,950,876, which is incorporated herein by reference.

Figure 2:
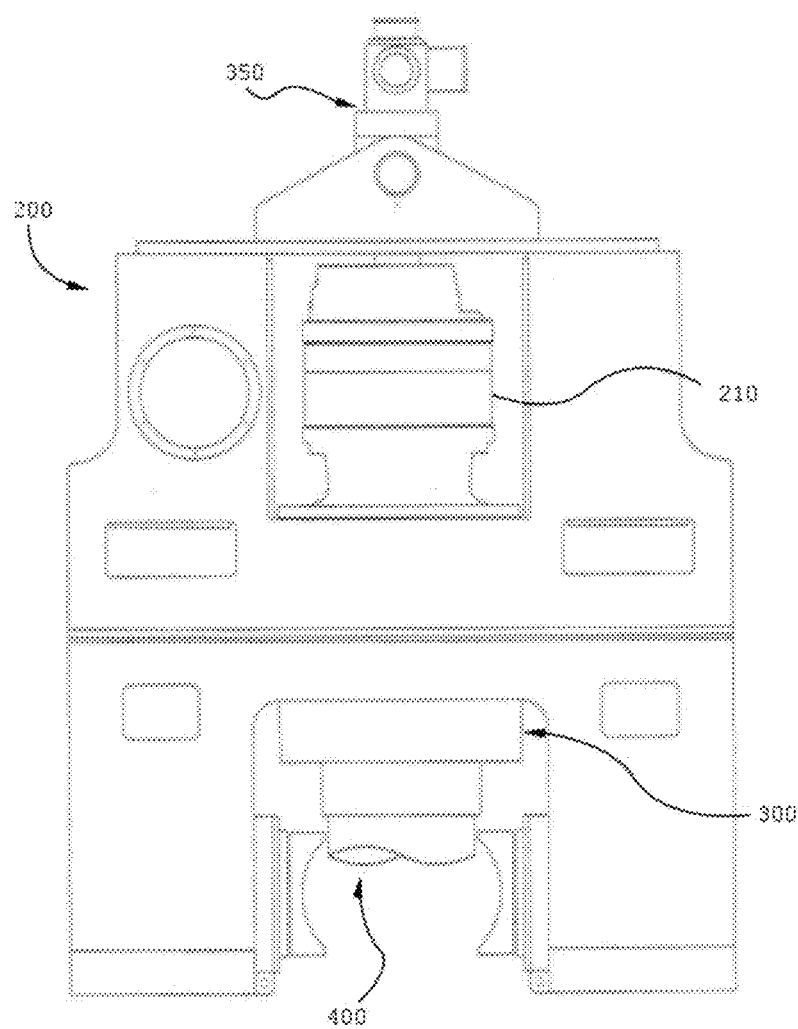
FIG. 2 is a perspective view showing the driver head, including a motor and drive shaft assembly encased in the pile driver casing. A portion of the attached pipe assembly is shown attached to the socket member.

Referring to FIG. 2, the motor casing 200 of FIG. 1 is shown in more detail. The motor casing 200 may enclose the drive motor assembly 210 and a drive shaft assembly 300. A grout fitting 350 (not shown in FIG. 2), which is optional, may be attached to the top of the drive shaft mechanism. Grout and/or other material may be pumped through grout fitting 350 and through the drive shaft assembly 300 into a pipe assembly 400 before, during or after the pipe assembly 400 is driven into the soil.

Figure 3:
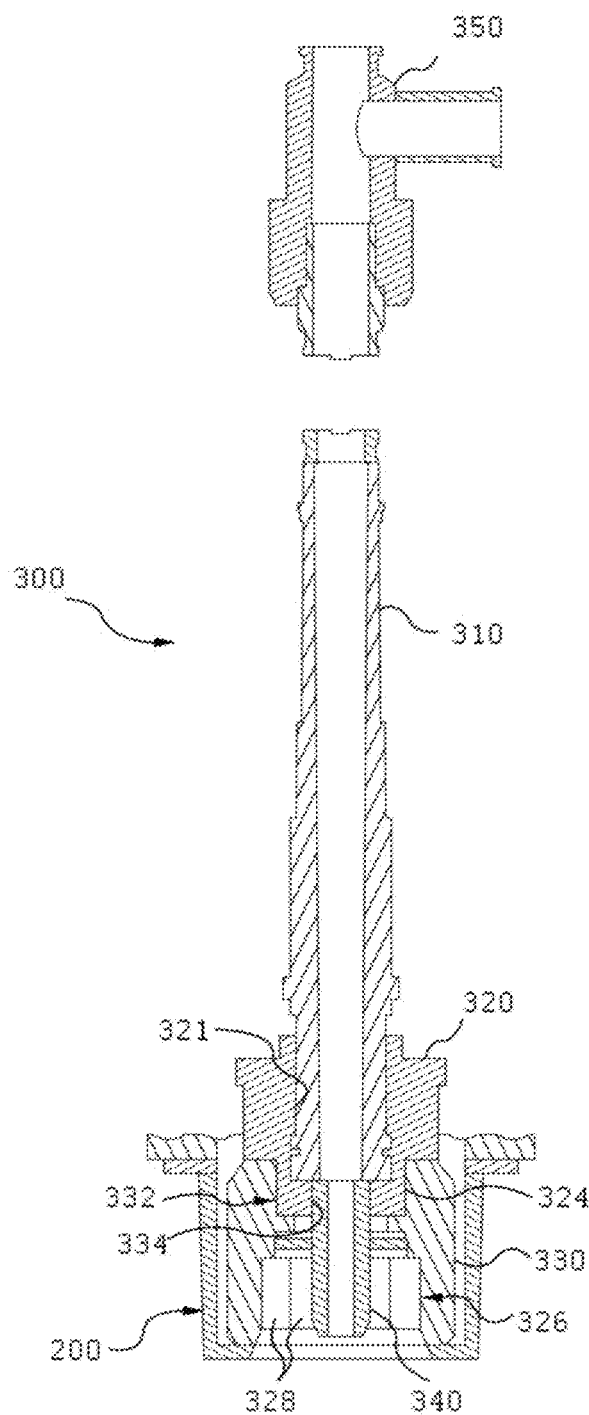
FIG. 3 is a section view showing the drive shaft assembly removed from the pile driver.
Figure 8:
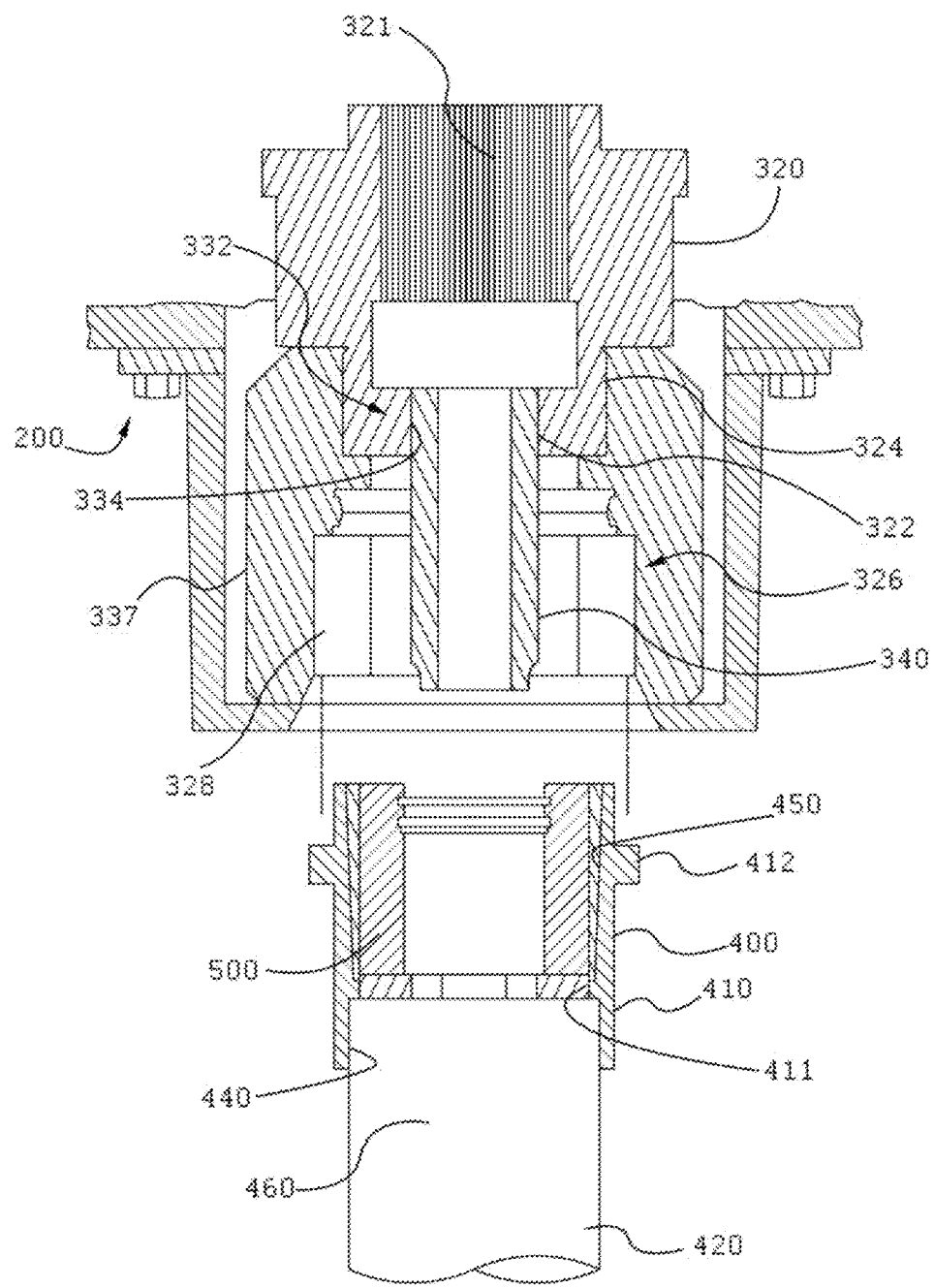
FIG. 8 is an exploded section view illustrating the pipe assembly including the coupler and the grout plug assembly, removed from the drive socket.

Referring to FIG. 3, the drive shaft assembly 300 is shown in cross section in isolation from the drive motor assembly 210 contained within the motor casing 200. A rotary output shaft 310 may transmit torque, and thence, rotational motion, from the drive motor assembly 210 to a rotary output member 320 through splines 321 formed on the interior of the rotary output member 320. The splines 321 are best shown in FIG. 8. The bottom end of the rotary output shaft 310 may have splines that mesh with the splines 321 of the rotary output member 320 so that, when the bottom end of the rotary output shaft 310 is seated in the rotary output member 320, relative rotation between the rotary output shaft 310 and the rotary output member 320 is generally prevented.

The rotary output member 320 may include a square-shaped external head 324 that, in turn, drives a socket member 330, which may include a drive socket 326 with octagonal socket wrench flats 328 designed to mate with the pipe assembly 400. The octagonal socket wrench flats 328 are merely one example of a shape suitable for the drive socket 326; those of skill in the art will recognize that nearly any non-circular shape may be suitable, as long as the shape of the drive socket matches that of the element of the pipe assembly 400 that is to fit into it. The use of an equilateral polygon such as an equilateral hexagon or octagon may beneficially allow insertion of the corresponding element of the pipe assembly 400 into the drive socket 326 at any of multiple discrete relative orientations.

The grout fitting 350 may be connected near the top of the rotary output shaft 310. The various openings and passageways in the grout fitting 350, rotary output shaft 310, rotary output member 320, and socket member 330 may be sufficiently large in size to permit a liquid or slurry such as grout to be pumped through the assembly.

The rotary output member 320 may have an external head portion 332 with an interior surface 334 with threads 322 (shown in FIG. 8) that accept threads 346 (shown in FIGS. 10A and 10B) of the grout tube 340. The grout tube 340 may be removably secured to the rotary output member 320 via the threads 322 and the threads 346. The grout tube 340 may also have an opening sufficiently large in size to permit a liquid or slurry such as grout to be pumped through the assembly when installed into rotary output member 320. The grout tube 340 may have a lower end that is designed to fit into the grout plug assembly 500 when connected.

Figure 4:
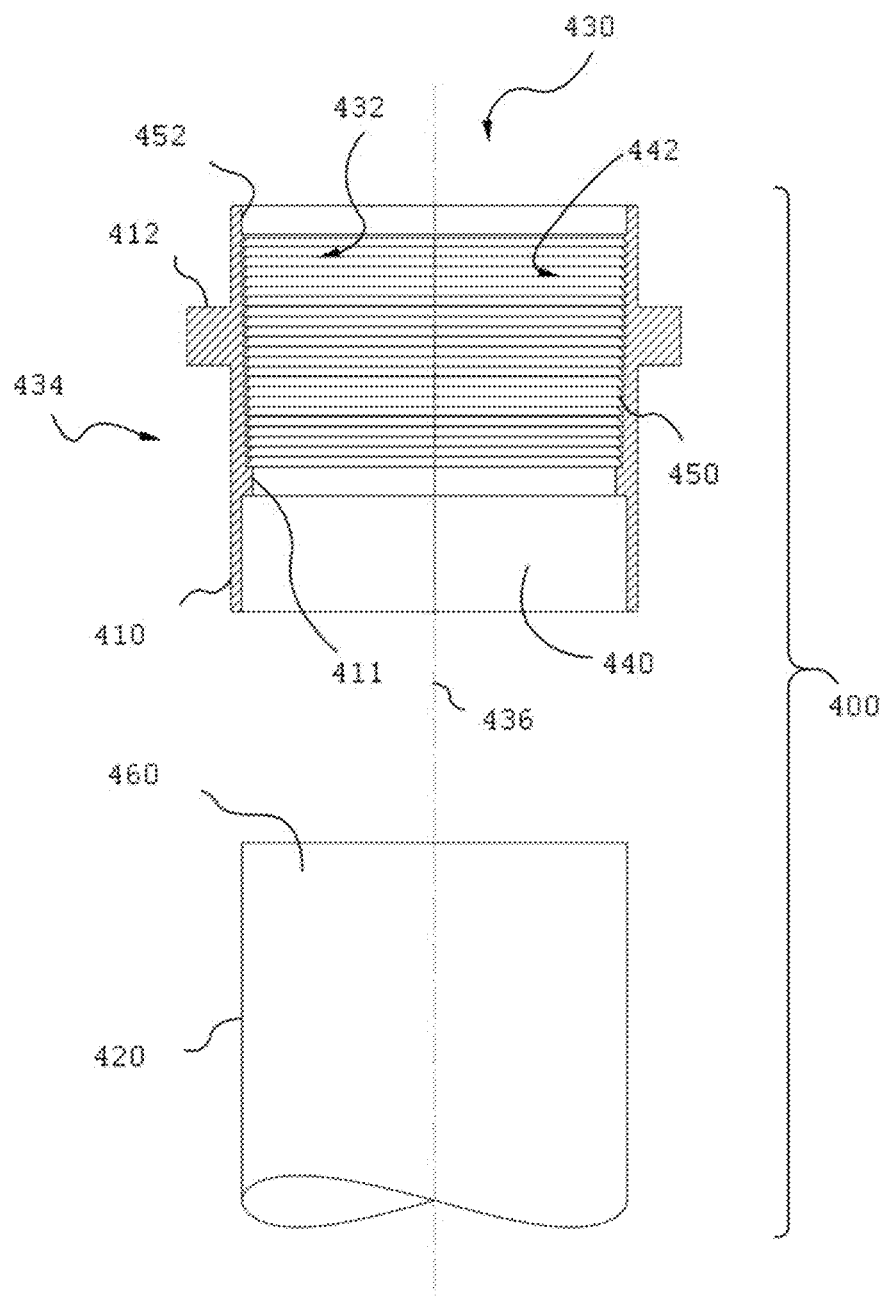
FIG. 4 is an exploded, section view showing the coupler and the top of a subtending pipe segment.

Referring to FIG. 4, the pipe assembly 400 may include a coupler 410. The coupler 410 may be used to attach a grout plug assembly 500 to the top of a pipe segment to facilitate introduction of grout or other materials into a pipe assembly, or to attach an overhead pipe to a subtending pipe in the pipe assembly.

As shown, the coupler 410 may have a body 430 with a generally tubular shape that defines an interior surface 432 and an exterior surface 434. The body 430 may be generally radially symmetrical about an axis 436. The interior surface 432 may have a lower receiving feature 440 designed to receive the top end of a subtending pipe segment of a pipe assembly, such as the top end 460 of the helical pipe 420 that is also shown in FIG. 4. The subtending pipe segment is the pipe segment immediately below the coupler 410, and may be the bottom pipe segment in the pipe assembly as in the case of the helical pipe 420, or may be an intermediate pipe segment residing above the bottom pipe segment. The interior surface 432 may also have an upper receiving feature 442 that receives the bottom end of an overhead pipe segment (not shown in FIG. 4).

As shown in FIG. 4, the lower receiving feature 440 may take the form of a lower smooth bore that slidably receives the top end 460. The top end 460 may also be smooth so as to be slidable along the axis 436 into the lower receiving feature 440. The top end 460 may be secured within the lower receiving feature via a weld, which may be placed, for example, along the circumference of the very bottom end of the coupler 410, where the top end 460 enters the lower receiving feature 440.

The upper receiving feature 442 may include an upper threaded bore 450 that threadably receives a corresponding threaded bottom end (not shown in FIG. 4) of an overhead pipe segment, e.g., the pipe segment immediately above the coupler 410. The upper receiving feature 442 may also include a lead-in portion 452 that facilitates alignment of the upper threaded bore 450 with the threaded bottom end of the overhead pipe segment. It should be understood that each pipe segment, except for the uppermost and the lowermost pipe segments in the pipe assembly 400, is both a subtending pipe segment when another pipe segment is disposed above, and an overhead pipe segment when another pipe segment is disposed below.

The lead-in portion 452 may take the form of an upper smooth bore that has an inside diameter that is at least as great as the largest inside diameter of the upper threaded bore 450. The lead-in portion 452 may advantageously have a length along the axis 436 of at least two threads of the upper threaded bore 450. This length may be sufficient to help align the coupler 410 with the overhead pile segment (not shown in FIG. 4) by causing the threaded bottom end (not shown in FIG. 4) to align with the axis 436 as the threaded bottom end passes through the portion 452. Thus, the threaded bottom end may be aligned with the upper threaded bore 450 by the time the threads are positioned to engage. This may help avoid cross-threading, binding, the need for multiple threading attempts, and other problems that may arise from improper alignment of threaded sections. The lead-in portion 452 may also be sufficiently short that it does not unnecessarily restrict engagement of the two threaded portions or add excessively to the length along the axis 436 of the coupler 410.

The coupler 410 may also have a stop feature 411 that helps control the depth of insertion of the overhead pipe segment (not shown) and/or the subtending pipe segment, such as the helical pipe 420. For example, as shown in FIG. 4, the stop feature 411 may take the form of a shoulder that protrudes inward relative to the lower receiving feature 440 and the upper receiving feature 442. Thus, the stop feature 411 may have a generally annular shape (e.g., a ring-like shape). The stop feature 411 may have an interior diameter that is smaller than a minimum diameter of the remainder of the interior surface 432, and therefore smaller than the smallest diameter of the upper threaded bore 450 and smaller than that of the lower receiving feature 440.

In the embodiment of FIG. 4, the stop feature 411 is formed integrally with the body 430. In alternative embodiments (not shown), the stop feature 411 may be a separate part from the body, and may be secured to the interior surface of the body by welding, brazing, chemical or adhesive bonding, or other methods known in the art.

The stop feature 411 may help to prevent over-insertion of the top end of the subtending pipe segment and/or the bottom end of the overhead pipe segment. According to one embodiment, the pipe assembly may be continuously twisted to drive it further into the ground. This torque may be in a direction that tends to continuously drive the threaded bottom end of the overhead pipe segment further into the upper threaded bore 450 of the upper receiving feature 442. Depending on the type of threads used for the upper threaded bore 450, such continued driving torque may tend to cause the threaded bottom end of the overhead pipe segment to bind with the upper threaded bore 450. Buttress threads may desirably be used for their overall strength, but such threads may be subject to binding in response to over-threading. This binding effect may make it difficult to remove the overhead pipe segment from the coupler 410 and/or weaken the threads securing the overhead pipe segment to the coupler 410, causing undesired deformation and/or failure of the interconnection.

The stop feature 411 may help to prevent the threaded bottom end of the overhead pipe segment from being over threaded into the upper threaded bore 450. With the stop feature 411 in place, torque driving the pipe assembly 400 deeper into the earth may not be able to drive the threaded bottom end past a bottom boundary of the upper threaded bore 450 because the bottom threaded end of the overhead pipe segment may abut the upper surface of the stop feature 411, thereby preventing the threaded bottom end from moving beyond the bottom boundary of the upper threaded bore 450. Thus, the stop feature 411 may help prevent over-threading of the bottom threaded end into the upper threaded bore 450.

Similarly, the stop feature 411 may help to prevent over-insertion of the top end of a subtending pipe segment such as the top end 460 of the helical pipe 420 shown in FIG. 4, into the lower receiving feature 440. This may be helpful in the context of a smooth top end such as the top end 460, to prevent over-insertion of the smooth top end, thereby preventing interference of the smooth top end with the upper receiving feature 442. The stop feature 411 may be of additional use for a coupler with a threaded lower receiving feature, as will be shown and described in connection with FIGS. 18-20, to prevent thread damage as discussed above in connection with the upper threaded bore 450.

The coupler 410 may also have a first flange 412 that extends outward from the exterior surface 434 and is generally perpendicular to the axis 436. The first flange 412 may have a noncircular shape that is designed to mate with the drive socket 326 (see FIG. 3) so that rotation of the drive socket 326 is conveyed to the coupler 410.

As mentioned previously, the drive socket 326 may have octagonal socket wrench flats 328 that provide the interior of the drive socket 326 with a generally octagonal shape. Thus, the first flange 412 may advantageously have an octagonal shape that mates with that of the drive socket 326. In alternative embodiments, a variety of non-circulars shapes may be used for a first flange, including a hexagon, curved shapes such as ellipses, asymmetrical cam surfaces, ovals, and the like. Such shapes may also include a wide variety of straight-sided shapes. The use of mating equilateral polygons is advantageous in that it may allow insertion of the first flange 412 into the drive socket 326 in any of multiple discrete relative orientations. For example, the octagonal shape of the first flange 412 and the corresponding octagonal shape of the octagonal socket wrench flats 328 may permit insertion of the first flange 412 into the drive socket 326 in any of eight distinct relative orientations.

In alternative embodiments, more than one flange may be used. One such coupler will be shown and described in connection with FIG. 20.

Figures 5A, 5B:
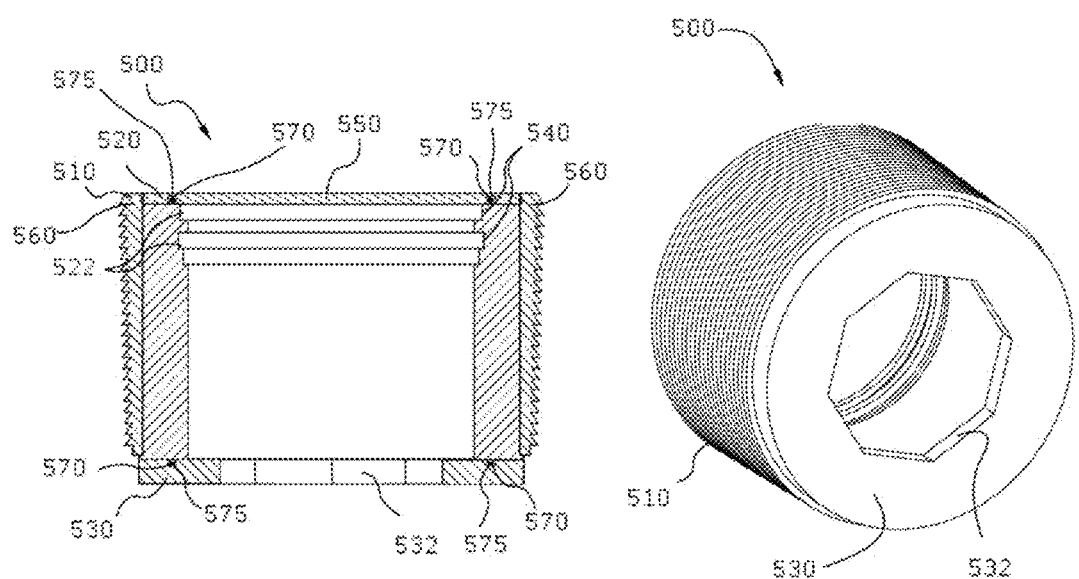
FIGS. 5A and 5B are section and perspective views, respectively, showing the grout plug assembly.

Referring now to FIGS. 5A and 5B, the grout plug assembly 500 is illustrated in greater detail. The grout plug assembly 500 may include a threaded sleeve 510, the threads of which are designed to thread into the upper threaded bore 450 of the coupler 410 in place of the bottom threaded end of an overhead pipe segment. The grout plug assembly 500 may further include a sleeve 520 and a spacer 530. The sleeve 520 may be formed as a single piece as shown in FIGS. 5A and 5B, or in alternative embodiments (not shown), may include one or more sleeve sections. In other alternative embodiments (not shown), the threaded sleeve 510, the sleeve 520, and/or the spacer 530 may be formed as a single piece. The spacer 530 may have an opening 532 with a generally octagonal shape, as best seen in FIG. 5B.

The sleeve 520 may also include recesses 522 for O-ring seals 540. Further, the grout plug assembly 500 may have a threaded cap 550 that engages interior threads 560 of the threaded sleeve 510. The threaded cap 550 and the spacer 530 may be sealed to the sleeve 520 by O-rings 570 positioned within recesses 575. As will be shown in FIG. 7, the central openings of the sleeve 520 and the spacer 530 of the grout plug assembly 500 may be designed to allow the grout tube 340 to fit through both sleeve 520 and spacer 530.

Figures 5C, 5D:
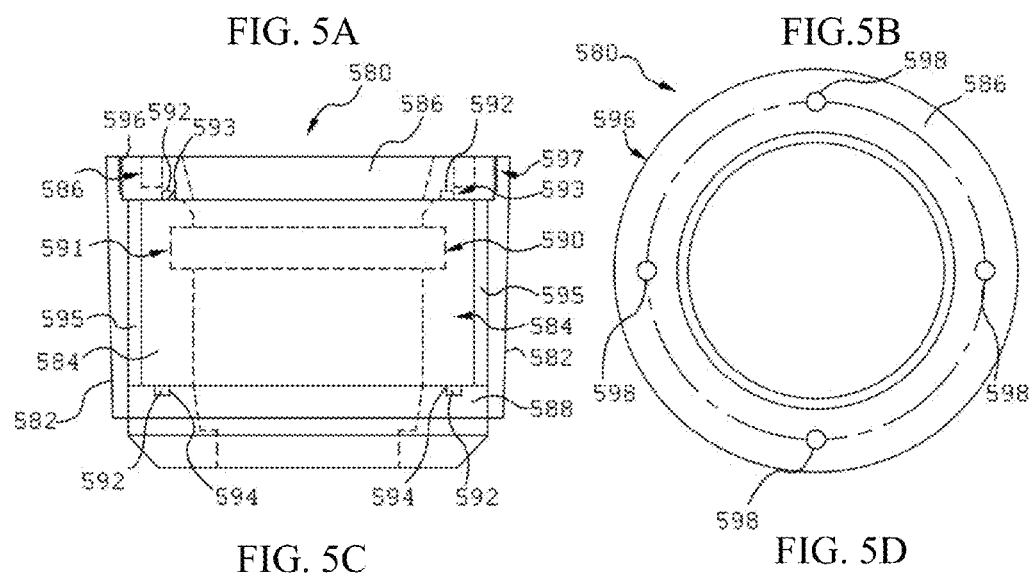
FIGS. 5C and 5D are a section and top view, respectively, showing another exemplary embodiment for a grout plug assembly.

FIGS. 5C and 5D show an exemplary alternative grout plug assembly 580 where the seal floats. The grout plug assembly 580 may include an outer housing 582, a cylindrical nylon insert 584, a top cap 586, a base cap 588, and a urethane rod U-seal 590. The urethane rod U-seal 590 is positioned within a groove 591 within the nylon insert 584. The nylon insert 584 floats on O-rings 592 positioned in recesses 593, 594 in the top cap 586 and the base cap 588, respectively. An annular gap 595 is provided so that the nylon insert 584 sealably floats within the grout plug assembly 580. This float of the seal allows for the coupler move within the socket, keeping the plug from breaking off the grout tube 340. The top cap 586 has peripheral threads 596 to engage interior threads 597 in the outer housing 582 and holes 598 that can be used to tighten the top cap 586 into threaded engagement with the outer housing 582. Of course, it should be understood that although the nylon insert 584 and the urethane rod U-seal 590 are made of exemplary materials, these components may be made of any other suitable material.

Figure 6:
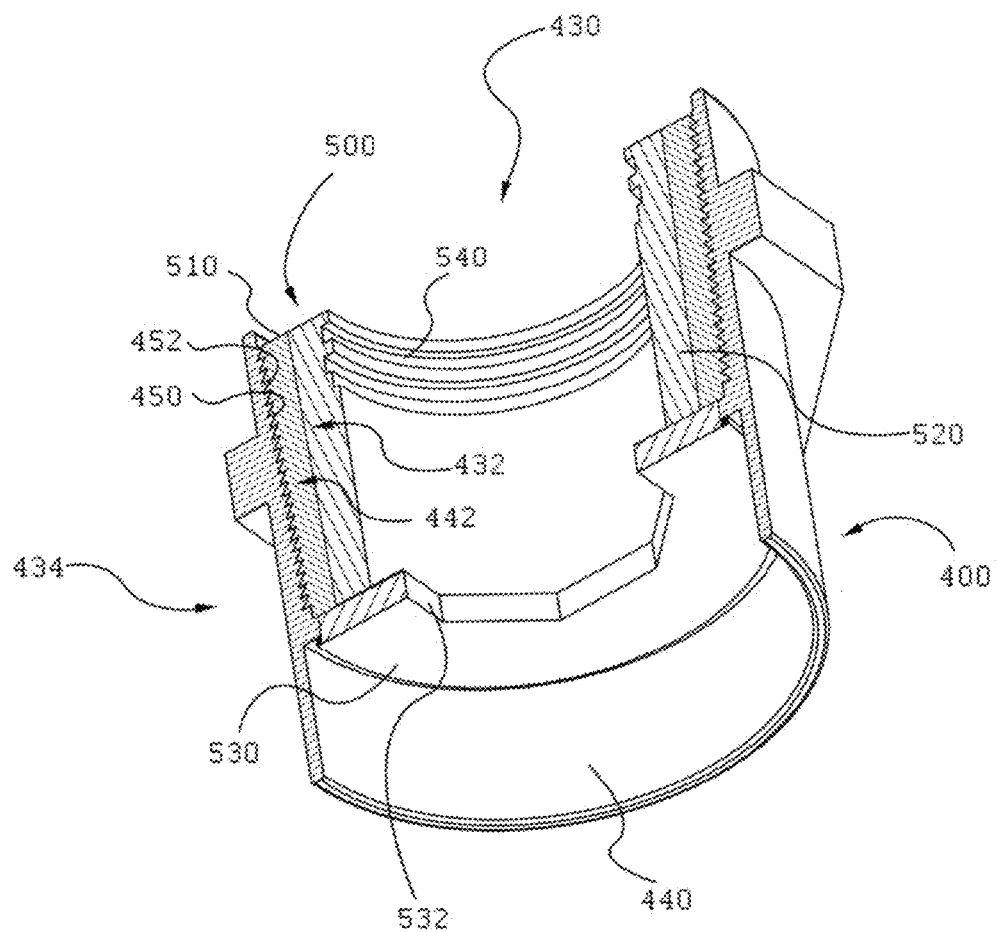
FIG. 6 is a section view of the grout plug assembly as inserted into the coupler in the absence of the subtending pipe segment.

Referring to FIG. 6, using a tool (not shown) with an octagonal protrusion, the grout plug assembly 500 may be inserted and removed from coupler 410 by hand. In alternative embodiments (not shown), a mechanized inserter may be used. In either engagement of an octagonal protrusion (not shown) with the opening 532 may facilitate rotation of the grout plug assembly 500 relative to the coupler 410 to thread the grout plug assembly 500 into engagement with the upper threaded bore 450 of the coupler 410. The stop feature 411 may be used to prevent over-insertion of the grout plug assembly 500 into the upper threaded bore 450. Of course, in alternative embodiments, the opening 532 and associated tools and/or protrusions may have different shapes that also serve to convey the desired rotational motion.

Figure 7:
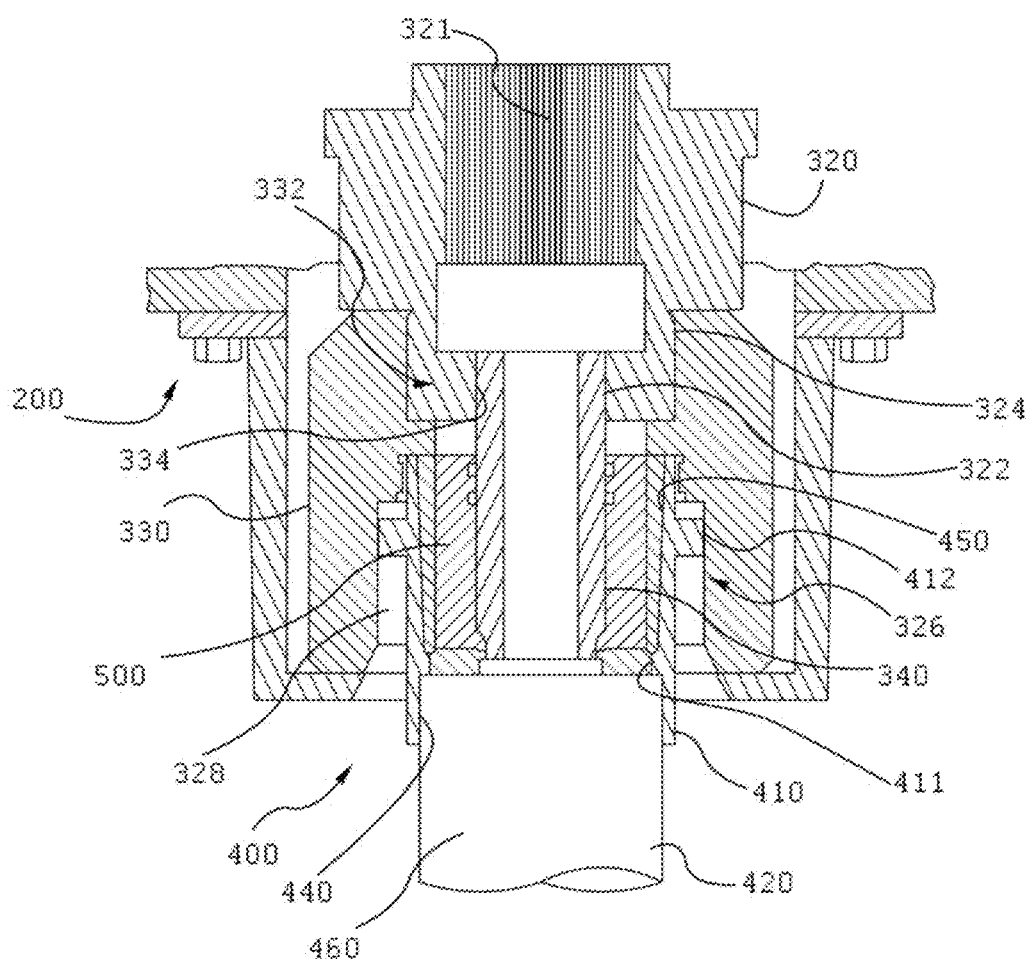
FIG. 7 is a section view showing one embodiment of the pipe assembly including the coupler and grout plug assembly, coupled to the drive socket.

Referring to FIG. 7, the grout plug assembly 500 may be inserted into the pipe assembly 400 as described in connection with FIG. 6. The pipe assembly 400 may then be coupled to the drive shaft assembly 300, which may include the grout tube 340. The grout tube 340 may fit into the grout plug assembly 500 as shown. Coupling of the pipe assembly 400 to the drive shaft assembly 300 may entail insertion of the first flange 412 into the drive socket 326 such that the flats of the first flange 412 engage the octagonal socket wrench flats 328 of the drive socket 326.

Once the various components have been assembled as shown in FIG. 7, grout may be introduced through the drive shaft assembly 300 into pipe assembly 400. These components may define a sealed environment that facilitates motion of the grout toward the bottom of the pipe assembly 400.

Referring to FIG. 8, after introduction of the desired quantity of grout, the pipe assembly 400 may be disengaged from the drive motor assembly 210 by withdrawing the first flange 412 of the coupler 410 from the drive socket 326. The grout plug assembly 500 may optionally be removed from the coupler 410 to permit the grout plug assembly 500 to be reused with a different pipe assembly, which may be similar to the pipe assembly 400.

Referring to FIGS. 9A and 9B, a side elevation view and a perspective view, respectively, illustrate the coupler 410 of FIG. 4. The coupler 410 will be shown in greater detail in connection with FIGS. 16 and 17.

Figures 10A, 10B:
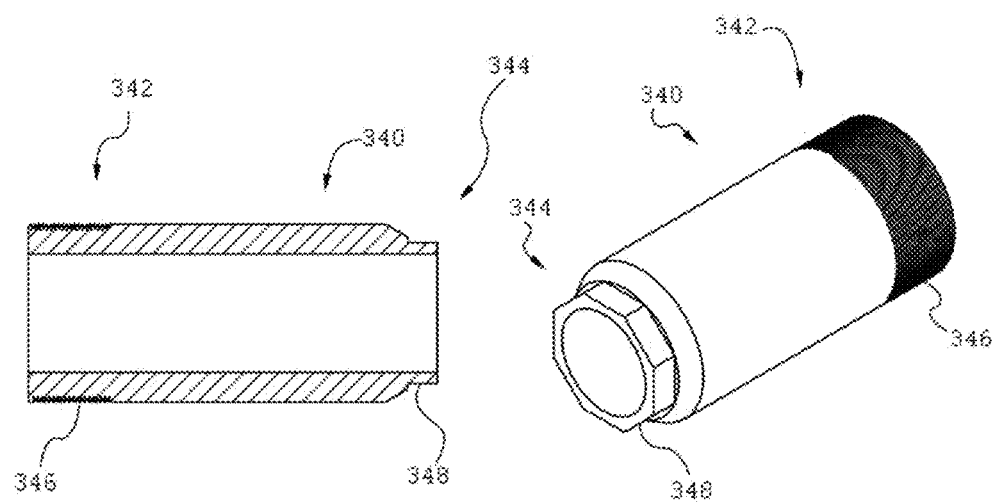
FIGS. 10A and 10B are section and perspective views, respectively, showing one embodiment of the grout tube.

Referring to FIGS. 10A and 10B, the grout tube 340 may have an upper threaded end 342 and a lower end 344. The upper threaded end 342 may have threads 346 that can be threaded into engagement with the threads 322 of the rotary output member 320. The lower end 344 may have a boss 348 that is shaped to fit into the opening 532 in the spacer 530 of the grout plug assembly 500. Thus, the boss 348 may have an octagonal shape that matches that of the opening 532.

The helical pipe 420 of the preceding embodiments may have a soil-penetrating tip that is generally integrated with or fixedly secured to the remainder of the helical pipe 420. In selected embodiments, the bottom pipe segment of a pipe assembly may be configured with a removable tip that facilitates introduction of grout or other material into the soil surrounding the bottom pipe segment. One such example will be shown in connection with FIGS. 11-15, as follows.

Figure 11:
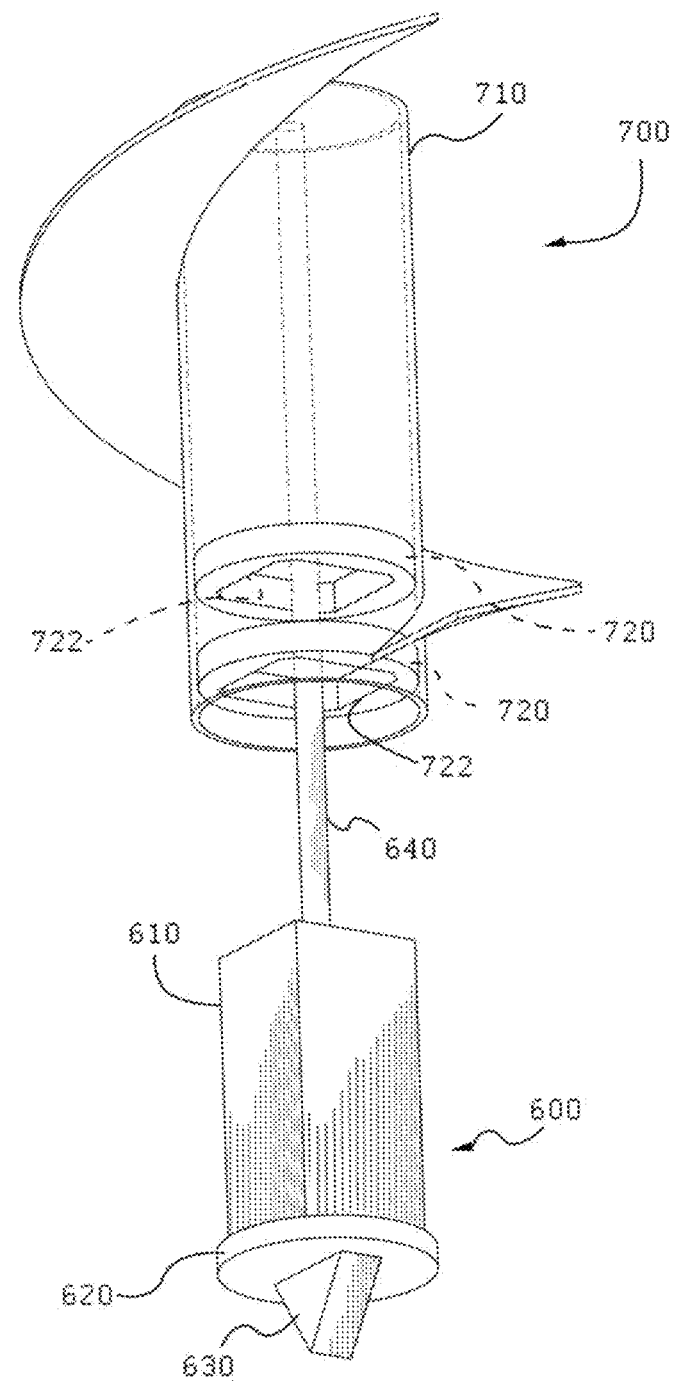
FIG. 11 is a perspective view showing the tip assembly and bottom end of a helical pile of a pipe assembly according to one alternative embodiment of the invention, with the tip assembly urged out of the bottom end.

Referring to FIG. 11, a perspective view illustrates a pipe assembly 700 according to one alternative embodiment of the invention. The pipe assembly 700 may include a helical pile 710 having internal receiving plates 720. The internal receiving plates 720 may be welded or otherwise secured within the interior of the helical pile 710. A tip assembly 600 may include a block 610 attached to a lower plate 620 and a tip 630. A rod section 640 may also be attached to the block 610 and may extend upward into the helical pile 710.

Figure 12:
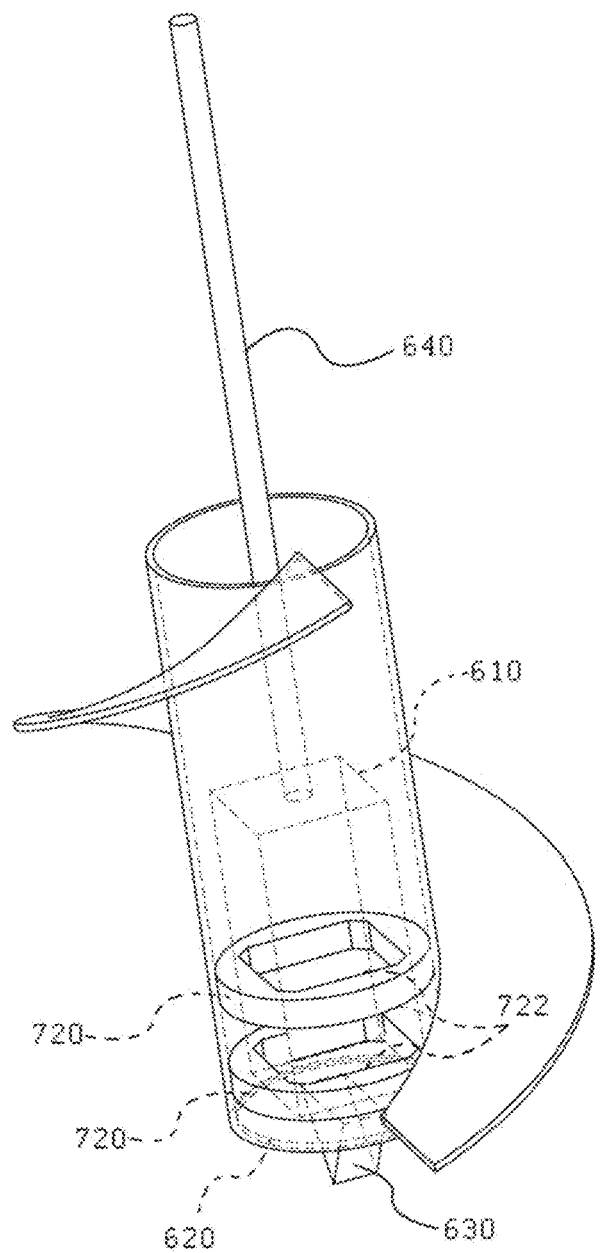
FIG. 12 is a perspective view showing the tip assembly and bottom end of FIG. 11, with the tip assembly engaged within the bottom end.

Referring to FIG. 12, the cross-section of block 610 may be designed to fit into openings 722 of the internal receiving plates 720. In the exemplary embodiment of FIG. 12, cross-sectional shape of the block 610, perpendicular to the axis of the helical pile 710, may be generally square. Thus, the openings 722 may also be generally square in shape as further shown in the section view of FIG. 15. Thus, relative rotation between the block 610 and the internal receiving plates 720 may be generally prevented while the block 610 is seated in the openings 722.

When the block 610 is seated in the openings 722 of the internal receiving plates 720, the lower plate 620 may fit snugly into the inner diameter of helical pile 710. This fit, along with the location of the internal receiving plates 720, may create a flush end as shown in FIG. 12, thus facilitating soil penetration with the tip 630.

Figure 13:
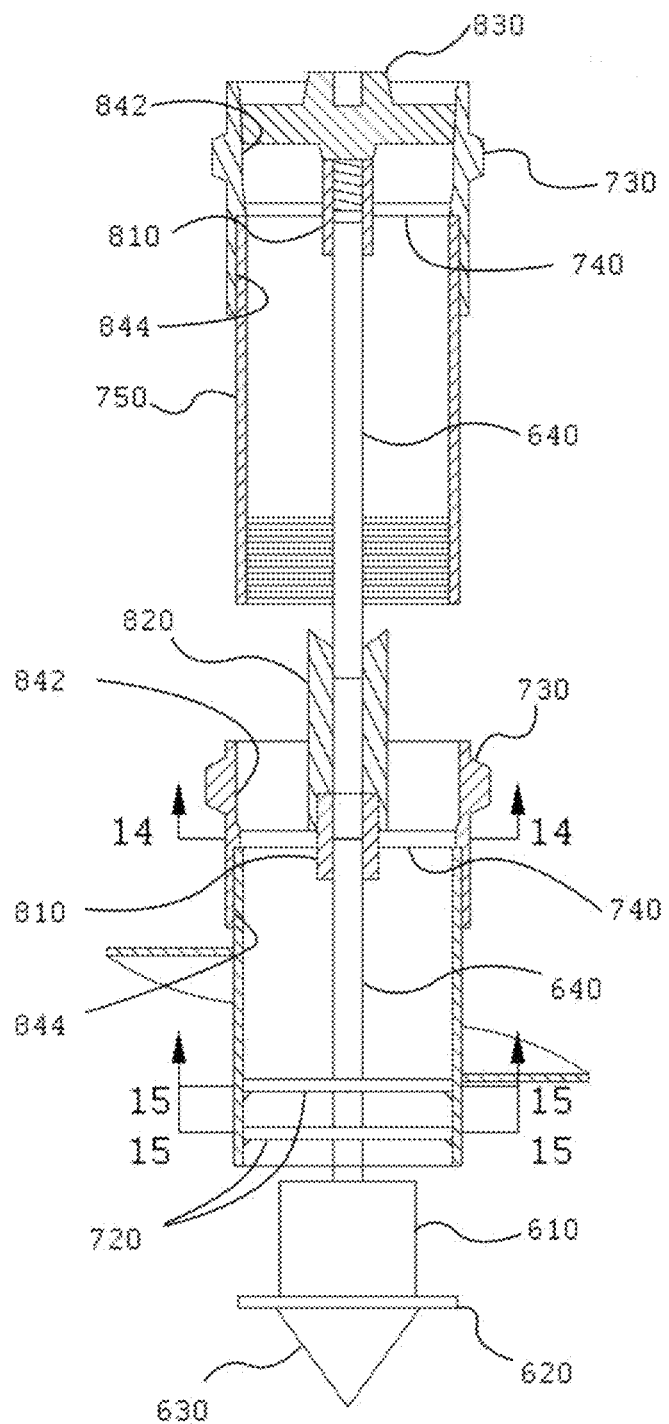
FIG. 13 is a section view showing the tip insert, the helical pile, and an overhead pipe segment partially coupled together via couplers and rod assemblies.

Referring to FIG. 13, the pipe assembly 700 optionally includes an overhead pipe segment 750 positioned above the helical pile 710 and secured to the helical pile 710 via a coupler 730. The overhead pipe segment 750 may be coupled to a segment above it via another coupler 730. The couplers 730 may be different in configuration from the coupler 410 disclosed previously.

Each of the couplers 730 may have an upper receiving feature 842 and a lower receiving feature 844 that are designed to receive the corresponding overhead and subtending pipe segments. The upper receiving feature 842 and the lower receiving feature 844 may each be smooth as shown in FIG. 13, or in alternative embodiments, such receiving features may have threads or other connecting elements.

If desired, a supplemental coupler (not shown) may be used to secure the bottom end of the overhead pipe segment 750 within the upper receiving feature 842 of the coupler 730 on the helical pile 710. More precisely, the bottom end of the overhead pipe segment 750 may have internal threading that engages corresponding external threads on such a supplemental coupler, and the supplemental coupler may also have a smooth lower end that engages the upper receiving feature 842 via press fitting or may be secured by welding or the like.

Additional rod sections 640 may also be used to span the height of the pipe assembly 700. The rod sections 640 may be added with each pipe segment in modular form. Thus, the rod sections 640 may be designed to be secured end-to-end, for example, via connectors 810 and/or sleeves 820. The connectors 810 and/or sleeves 820 may receive the ends of the rod sections 640 in a relatively secure manner so that downward motion of the topmost rod section 640 is conveyed downward through all of the rod sections 640 to the tip assembly 600. If desired, each of the rod sections 640 may have a threaded top end and a threaded bottom end, each of which may be threaded into engagement with a corresponding internally threaded end of the associated connector 810.

Each of the couplers 730 may have a centralizer 740 that receives the corresponding rod section 640 and/or connector 810. The centralizer 740 may serve to keep the corresponding rod section 640 and/or connector 810 centered along the axis of the helical pile 710 and/or the other pipe segments such as the overhead pipe segment 750.

Figure 14:
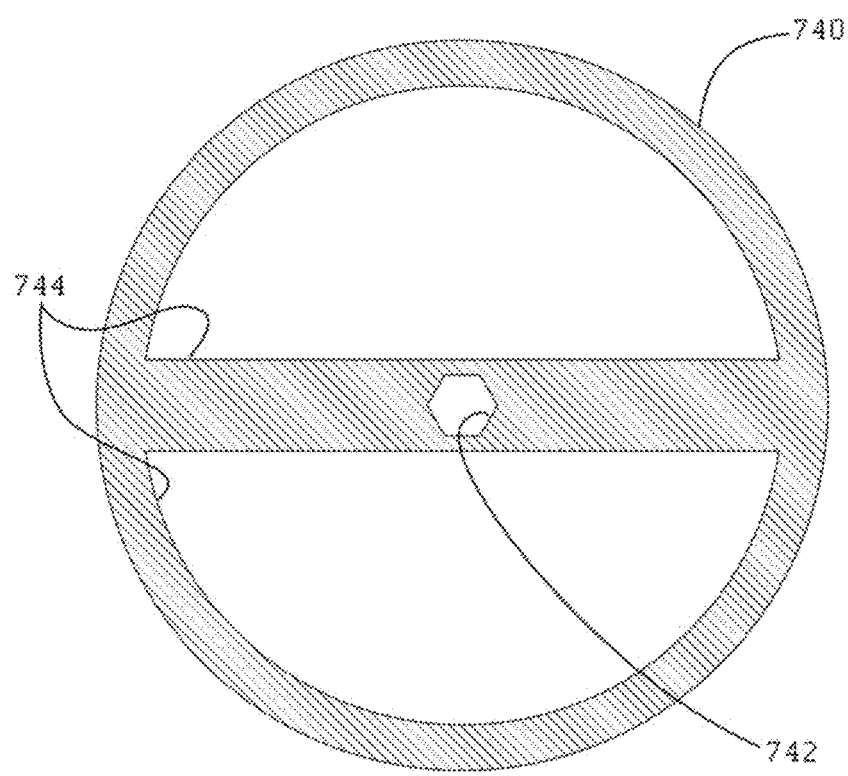
FIG. 14 is a section view showing the centralizer of FIG. 13 in greater detail.

Referring to FIG. 14, a section view illustrates the cross-sectional shape of each of the centralizers 740. As shown, each of the centralizers 740 may have an opening 742 positioned at its center. The opening 742 may be sized to receive the corresponding rod section 640 and/or connector 810. If desired, the opening 742 may have a polygonal shape such as the hexagonal shape illustrated in FIG. 14. The corresponding rod section 640 and/or connector 810 may also have such a polygonal shape so that relative rotation between the centralizer 740 and the corresponding rod section 640 and/or connector 810 is restricted.

In addition to the opening 742, each centralizer 740 may have a pair of openings 744 that permit flow of grout or other materials through the centralizer 740. Thus, each centralizer 740 may maintain concentricity of the corresponding rod section 640 and/or connector 810 with the remainder of the pipe segment without significantly restricting grout flow therethrough.

Figure 15:
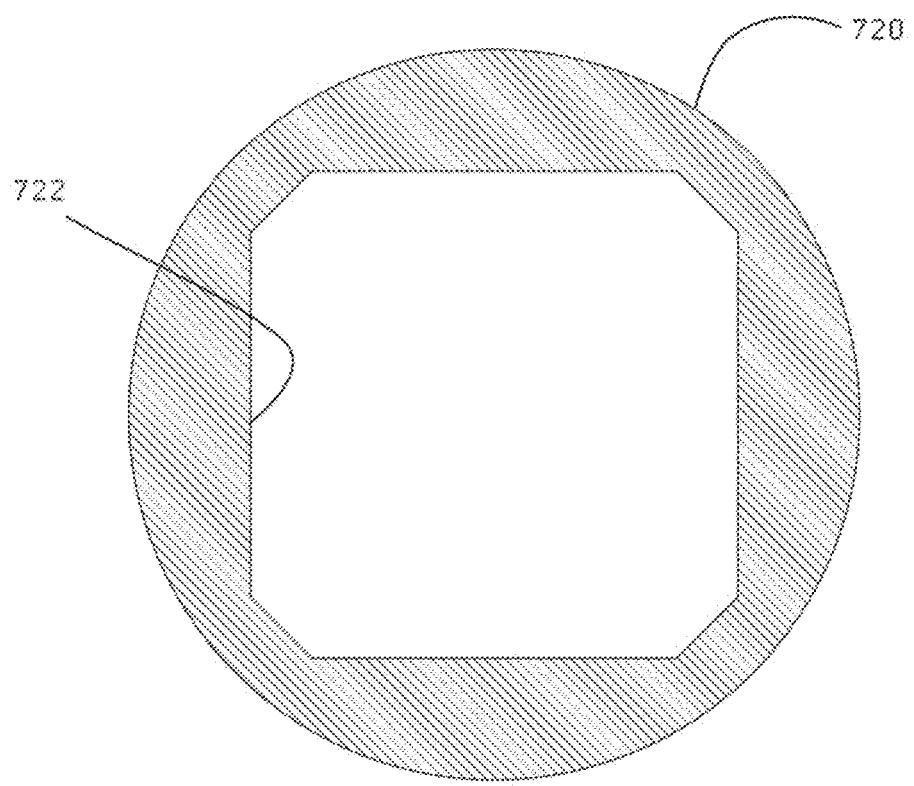
FIG. 15 is a section view showing the internal receiving plates of FIG. 13 in greater detail.

Referring to FIG. 15, a section view illustrates the cross-sectional shape of each of the internal receiving plates 720. The generally square shape of the openings 722 is also shown. In alternative embodiments (not shown), block 610 may have a different cross sectional shape such as a different polygonal shape or a curved shape. Although the complementary shapes of the block 610 and the openings 722 serve to prevent relative rotation in the embodiment of FIGS. 11-15, such relative rotation may be permitted in alternative embodiments. Thus, a cylindrical block (not shown) may be used in combination with internal receiving plates (not shown) with circular openings.

Figure 16:
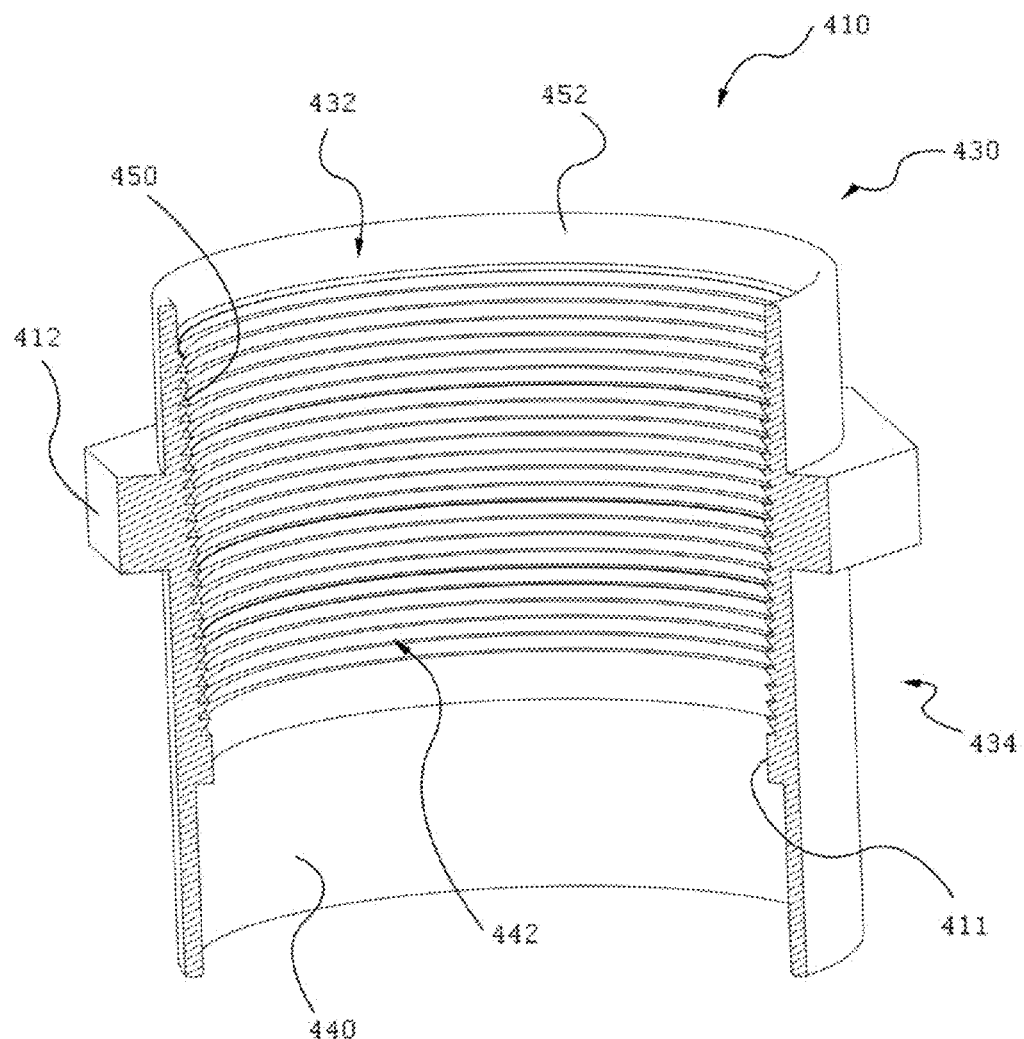
FIG. 16 is a cutaway view showing one embodiment of the coupler of FIG. 4 in greater detail.

Referring to FIG. 16, a cutaway view illustrates the coupler 410 in greater detail. The coupler 410 is shown in isolation, i.e., prior to coupling of the coupler 410 to an overhead pipe segment or a subtending pipe segment. The coupler 410 may be designed to receive the top end of a subtending pipe segment that has a smooth exterior surface. This will be shown and described in connection with FIG. 17.

Figure 17:
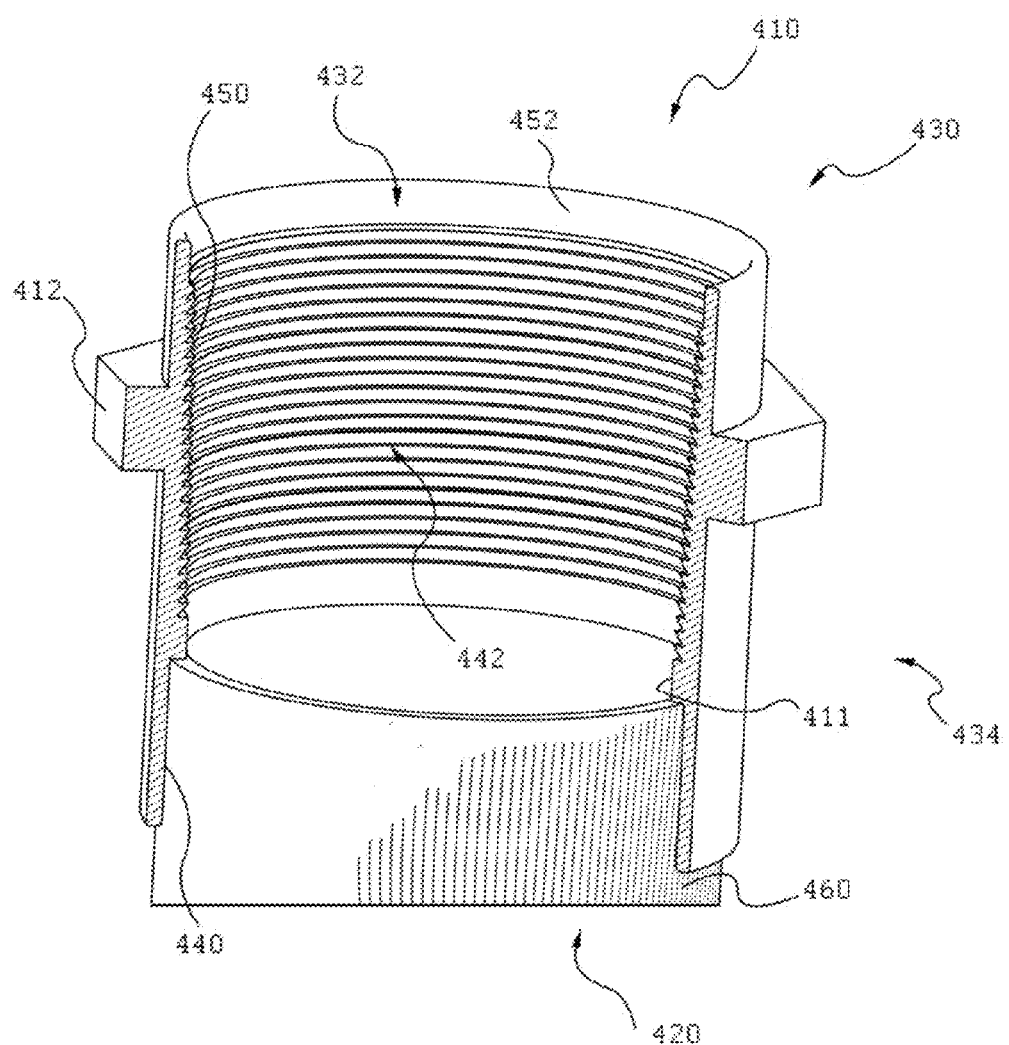
FIG. 17 is a cutaway view showing the coupler of FIG. 16 coupled to the top end of a subtending pipe segment.

Referring to FIG. 17, a cutaway view illustrates the coupler 410 with a subtending pipe segment, which may be the helical pipe 420 shown in FIG. 4. The top end 460 of the helical pipe 420 may have a smooth exterior surface, which has been inserted into the lower receiving feature 440 of the coupler 410. As mentioned previously, the top end 460 may be welded in place, for example, by forming a circumferential weld around the bottom edge of the coupler 410 where the top end 460 passes into the lower receiving feature 440. In alternative embodiments, press fitting, brazing, chemical or adhesive bonding, and/or other methods known in the art may be used to secure the top end 460 to the coupler 410.

Figure 18:
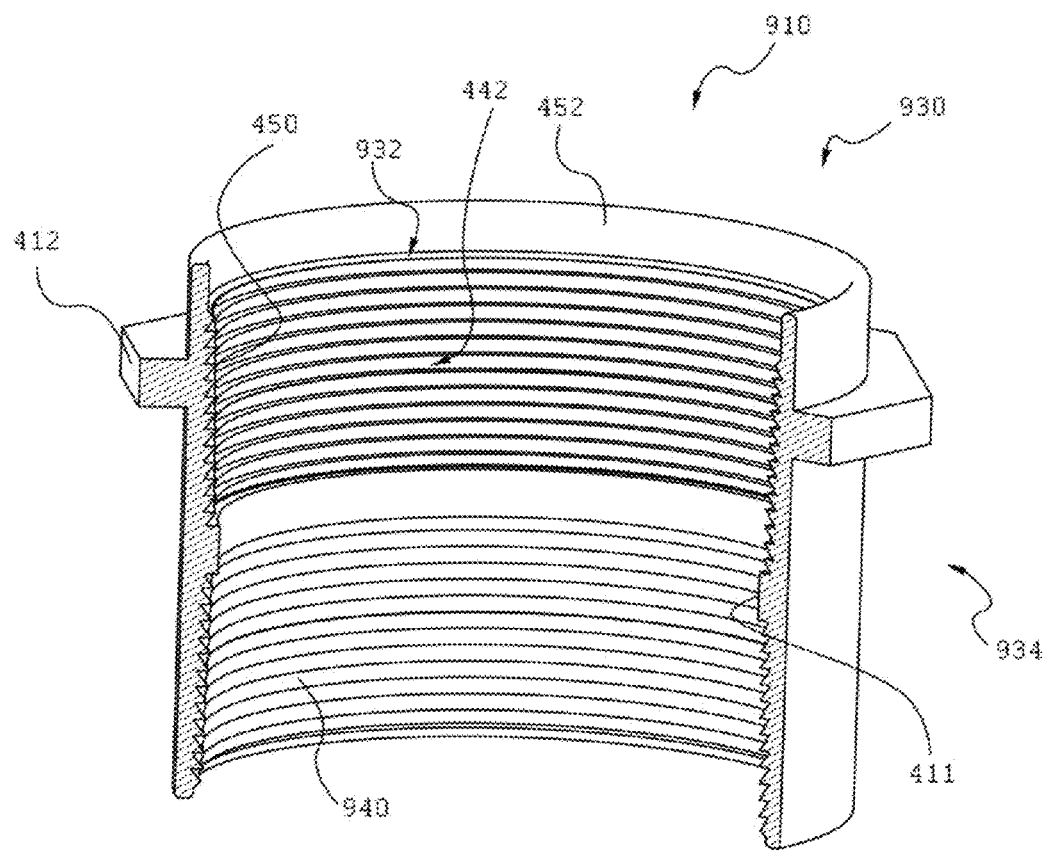
FIG. 18 is a cutaway view showing an alternative coupler.

Referring to FIG. 18, a cutaway view illustrates a coupler 910 according to one alternative embodiment. The coupler 910 may be similar to the coupler 410, except that the coupler 910 is designed to receive the top end of a subtending pipe segment having a threaded exterior surface. Thus, the coupler 910 may have a body 930 that is somewhat longer than the body 430 of the coupler 410. The body 930 may have a generally tubular shape with an interior surface 932 and an exterior surface 934. The body 930 also has an axis (not shown), which may be the axis of symmetry of the generally tubular shape of the body 930, and thus passes vertically through the center of the body 930 in the orientation of FIG. 18.

Figure 19:
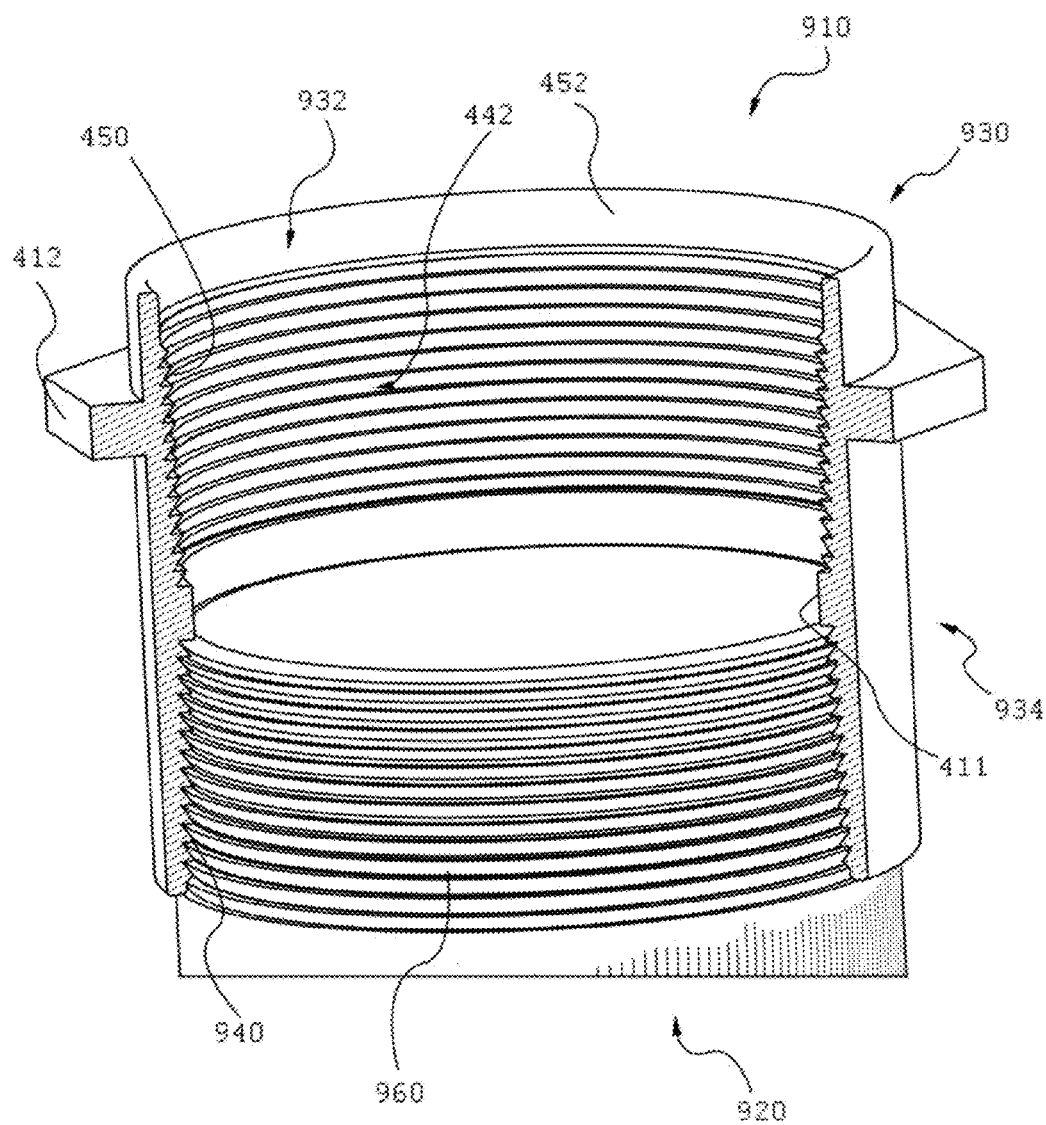
FIG. 19 is a cutaway view showing the alternative coupler of FIG. 18 coupled to the top end of a subtending pipe segment.

The interior surface 932 may define a lower receiving feature 940, which may take the form of a lower threaded bore with threads that receive the threads of a threaded exterior surface on the top end of a subtending pipe segment, which will be shown in FIG. 19. The interior surface 932 may also define an upper receiving feature 442, which may be substantially identical to that of the coupler 410. Thus, the upper receiving feature 442 may have an upper threaded bore with a lead-in portion 452. If desired, the lower receiving feature 940 may be modified to provide a lead-in portion (not shown) similar to the lead-in portion 452 of the upper receiving feature 442.

The interior surface 932 may also have a stop feature 411 like that of the coupler 410. In the coupler 910, the stop feature 411 may separate the upper threaded bore 450 from the threads of the lower receiving feature 940.

Referring to FIG. 19, a cutaway view illustrates the coupler 910 with a subtending pipe segment 920, which may be a helical pipe or a different pipe segment such as a segment positioned above a helical pipe. A top end 960 of the subtending pipe segment 920 may have a threaded exterior surface, which has been threaded into engagement with the threads of the lower receiving feature 940 of the coupler 910.

The threads of the lower receiving feature 940 and the upper receiving feature 442 may each be oriented such that rotation of the pipe assembly tends to drive the corresponding end of the adjacent pipe segment deeper into threaded engagement with the coupler 910, thus driving the pipe segment ends toward the stop feature 411. The stop feature 411 may advantageously help to prevent over-insertion of both the subtending pipe segment 920 and an overhead pipe segment (not shown) by preventing the threaded end of either pipe segment from passing beyond the top or bottom boundary of the lower receiving feature 940 or the upper receiving feature 442, respectively.

Figure 20:
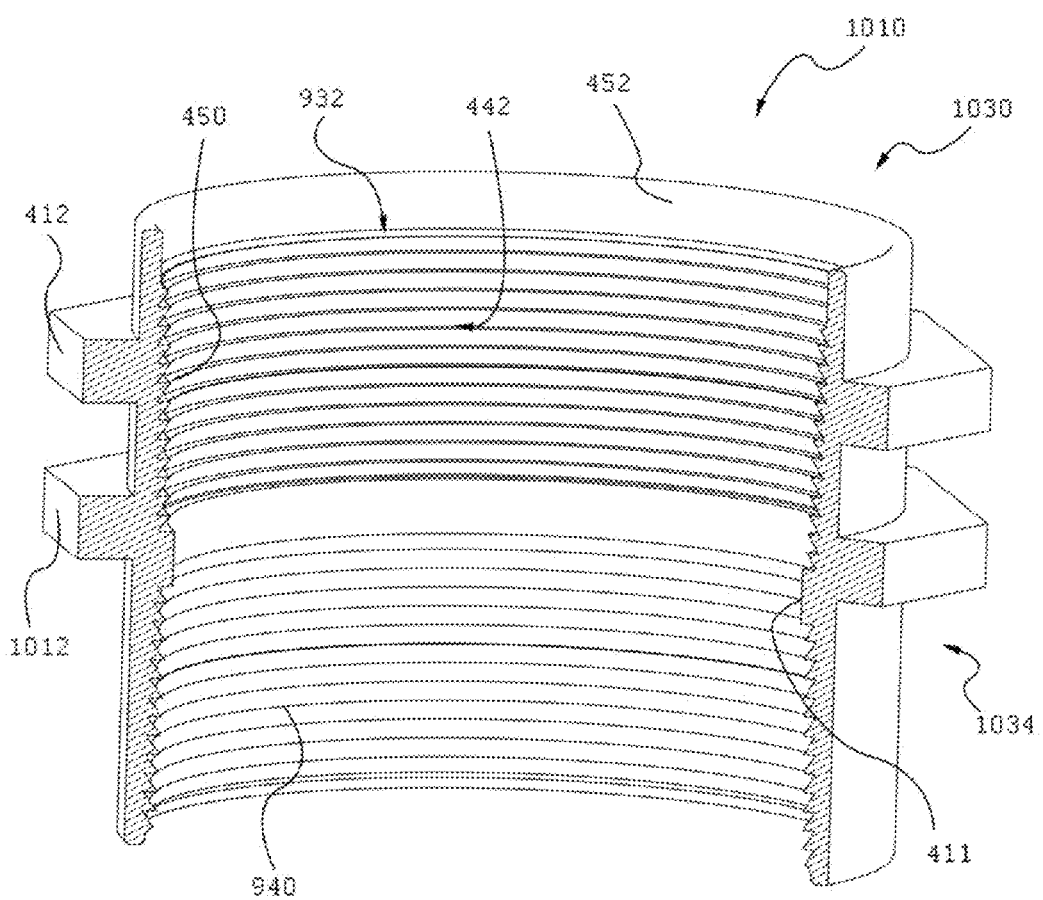
FIG. 20 is a cutaway view showing yet another alternative coupler.

Referring to FIG. 20, a cutaway view illustrates a coupler 1010 according to yet another alternative embodiment. Like the coupler 910, the coupler 1010 may have a body 1030 with a generally tubular shape. The body 1030 may have an interior surface 932 that is substantially the same as that of the body 930 of the coupler 910, and thus has the features of the interior surface 932 as set forth in the description of the previous embodiment. However, the body 1030 may have an exterior surface 1034 that is different from that of the previous embodiment in that a second flange 1012 extends outward from the exterior surface 1034, substantially perpendicular to the axis of the body 1030.

The second flange 1012 may be substantially identical to the first flange 412, and may also be aligned with the first flange 412 so that the first flange 412 and the second flange 1012 may both be inserted into the drive socket 326 of the socket member 330. The second flange 1012 may help provide a second point of contact of the coupler 1010 with the drive socket 326. Thus, the second flange 1012 may beneficially help to maintain coaxiality between the socket member 330 and the coupler 1010 when the coupler 1010 is coupled to the socket member 330.

This enhanced coaxiality may help smooth the rotary motion imparted to the pipe assembly 400 or the pipe assembly 700 by the socket member 330 through the coupler 1010, and may also reduce wear between the coupler 1010 and the socket member 330. Additionally, the coupler 1010 may be less likely to bind or otherwise become lodged within the drive socket 326 of the socket member 330. Yet further, the presence of the second flange 1012 may make the coupler 1010 easier to align with and properly insert into the drive socket 326.

Although, as embodied in FIG. 20, the first flange 412 and the second flange 1012 are substantially identical, this need not be the case in all embodiments. For example, a drive socket (not shown) may have two different cross sectional shapes that receive two differently-shaped flanges. Additionally, first and second flanges according to the invention need not both be non-circular. If desired, one may be non-circular, and may thus be the flange that receives the torque form the corresponding socket member. The other flange may be circular, and may thus not transmit torque, but may instead serve only to help maintain coaxiality between the coupler and the socket member 330.

According to one method of penetrating soil, a rotary drive motor such as disclosed in U.S. Pat. No. 6,942,430 may be provided with rotary output shaft 310, rotary output member 320, socket member 330, grout tube 340, and grout fitting 350 as shown and described above. The grout plug assembly 500 may be threaded into the coupler 410 of the pipe assembly 400 by turning spacer 530, for example, with a hand tool having a protrusion shaped to engage the opening 532 of the spacer 530. The coupler 410 of the pipe assembly 400 with the grout plug assembly 500 may then be coupled to the socket member 330 by inserting the first flange 412 of the coupler 410 into the drive socket 326 of the socket member 330.

Once the various components have been coupled to the drive motor assembly 210 as set forth above, the movable boom 100 may raise the drive motor assembly 210 and the pipe assembly 400 until the lower end of pipe assembly 400 can be coupled to the coupler 410 of the pipe segment already in the ground. This may be done by threading the threaded bottom end of the pipe segment coupled to the drive motor assembly 210 into engagement with the upper threaded bore 450 of the coupler 410 of the pipe segment in the ground.

The pipe assembly 400 may then be driven into the ground, for example, by rotating the pipe segment coupled to the drive motor assembly 210, thereby inducing rotation of the helical pipe 420, which draws the pipe assembly 400 deeper into the ground. Once the pipe assembly 400 has reached the desired depth, grout may be pumped into the pipe assembly 400 through the grout fitting 350 and thence, into the borehole created in the earth via introduction of the pipe assembly 400. With the helical pipe 420, this may be done by releasing the grout from holes (not shown) that may be positioned proximate the bottom end of the helical pipe 420. Grout may be released continuously during soil penetration, intermittently during one or more pauses in soil penetration, or only after the pipe assembly 400 has reached its final depth.

If the helical pile 710 is used, the rod sections 640 may be urged downward to urge the tip assembly 600 out of the bottom end of the helical pipe 420 or the helical pile 710. This may facilitate egress of grout from the bottom end of the helical pile 710 and into the bore hole. If desired, downward motion of the helical pile 710 may be stopped periodically to eject the tip assembly 600, release grout, and then re-seat the tip assembly 600 prior to continued penetration. Alternatively, in some instances, the tip assembly 600 can be unseated from the helical pile 710 by reversing the rotation and backing the helical pipe 710 off the full depth so that the tip assembly 600 is left at full depth.

Once the grouting process is complete, the pipe assembly 400 may be disengaged from the socket member 330 by removing the first flange 412 of the coupler 410 from the drive socket 326 of the socket member 330. The grout plug assembly 500 may then be removed from the coupler 410 at the top of the pipe assembly 400 by turning spacer 530 in a direction opposite to that used to thread the grout plug assembly 500 into engagement with the coupler 410. The next pipe segment may be threaded into engagement with the coupler 410, and may be coupled to the socket member 330 through the use of another coupler 410.

All references cited herein, including patents, patent applications, and publications, are hereby incorporated by reference in their entireties, whether previously specifically incorporated or not.

Having now fully described the inventive subject matter, it will be appreciated by those skilled in the art that the same can be performed within a wide range of equivalent parameters, concentrations, and conditions without departing from the spirit and scope of the disclosure and without undue experimentation.

While this disclosure has been described in connection with specific embodiments thereof, it will be understood that it is capable of further modifications. This application is intended to cover any variations, uses, or adaptations of the disclosure following, in general, the principles of the disclosure and including such departures from the present disclosure as come within known or customary practice within the art to which the disclosure pertains and as may be applied to the essential features hereinbefore set forth.

What is claimed is:

1. A coupler assembly for connecting to a top end of a subtending pipe pile segment and a threaded bottom end of an overhead pipe pile segment to extend the length of a pipe pile assembly, the coupler assembly for receiving in sealed engagement a grout tube to facilitate continuous grouting and for receiving a driving force of a drive socket, the coupler assembly comprising:
    a grout plug assembly comprising a threaded sleeve and a spacer, the grout plug assembly for receiving the grout tube in sealed engagement to facilitate continuous grouting, the spacer having an opening that permits flow through of grout and facilitates removal of the grout plug assembly;
    a coupler for receiving a soil penetrating driving force of a drive socket to drive the pipe pile assembly into the soil, the grout plug assembly being capable of threaded engagement with the coupler during the application of the soil penetrating force:
        a body having a generally tubular shape having an axis, the body comprising an exterior surface and an interior surface, the interior surface comprising a lower receiving feature shaped to receive the top end of one subtending pipe pile segment and an upper receiving feature threaded to receive selectively in threaded engagement between one overhead pipe pile segment and the grout plug assembly, the grout plug assembly and the grout tube each being removably receivable from the upper receiving feature while disposed above the soil;
        a first flange secured to the exterior surface, wherein the first flange extends generally perpendicular to the axis, the first flange having a first noncircular shape insertable into the drive socket to enable the drive socket to transmit rotation about the axis to the body through the first flange; and
        a second flange secured to the exterior surface, wherein the second flange extends generally perpendicular to the axis, the second flange having a second shape that is aligned with the first noncircular shape such that the second shape is also insertable into the drive socket to enable the drive socket to transmit rotation about the axis to the body through the second flange;
        wherein the first and second flanges are spaced apart from each other.

2. The coupler of claim 1, wherein the first noncircular shape is an equilateral polygon, wherein the second shape is substantially identical to the first noncircular shape.

3. The coupler of claim 1, wherein the lower receiving feature comprises a lower smooth bore shaped to receive a smooth exterior surface of the top end of the subtending pipe pile segment.

4. The coupler of claim 1, wherein the lower receiving feature comprises a lower threaded bore shaped to receive a threaded exterior surface of the top end of the subtending pipe pile segment.

5. The coupler of claim 1, wherein the upper receiving feature comprises an upper threaded bore shaped to receive a threaded exterior surface of the bottom end of the overhead pipe pile segment.

6. The coupler of claim 5, wherein the upper receiving feature further comprises a lead-in portion above the upper threaded bore, wherein the lead-in portion comprises an upper smooth bore having a length along the axis that is equal to or greater than a length along the axis of two threads of the upper threaded bore.

7. The coupler of claim 5, wherein the interior surface further comprises a stop feature positioned to prevent insertion of the bottom end of the overhead pipe pile segment beyond a lower boundary of the upper receiving feature.

8. The coupler of claim 7, wherein the stop feature comprises a shoulder formed as a single piece with the body, the shoulder having a generally annular shape with an inside diameter smaller than a minimum inside diameter of the upper threaded bore.

9. A method for penetrating soil with a pipe pile assembly and for introducing a liquid or slurry into the pipe pile assembly through a grout tube during soil penetration of the pipe pile assembly, the method comprising:
    coupling a top end of a subtending pipe pile segment to a coupler, the coupler comprising a body having a generally tubular shape having an axis, the body comprising an exterior surface and an interior surface, the interior surface comprising a lower receiving feature and an upper receiving feature, the upper receiving feature having threads;
    coupling the upper receiving feature of the coupler to a grout plug assembly, the grout plug assembly having threads for engaging the upper receiving feature in threaded engagement, the grout plug assembly having an axial opening for receiving a grout tube, the grout plug assembly and the grout tube each being removably receivable from the upper receiving feature while the coupler is disposed above the soil;
    inserting the grout tube into the grout plug assembly such that the grout tube seals against the grout plug assembly and the liquid or slurry passes through the axial opening into the subtending pipe pile segment;
    engaging the coupler with a drive socket, the coupler further comprising a first flange and a second flange spaced apart from the first flange, wherein the each of the first and second flanges is secured to the exterior surface and extends generally perpendicular to the axis, wherein engaging the coupler with the drive socket comprises:
        inserting the first flange into the drive socket such that the first flange engages the drive socket; and
        after insertion of the first flange into the drive socket, inserting the second flange into the drive socket such that the second flange engages the drive socket; and
    drivably rotating the subtending pipe pile segment by transmitting rotation from the drive socket to the coupler via the first and second flanges, and from the coupler to the subtending pipe pile segment;
    introducing the liquid or slurry through the grout tube into the subtending pipe pile segment while the coupler and the subtending pipe pile segment are being drivably rotated and before the coupler enters the soil;
    halting the rotation of the coupler and the subtending pipe pile segment when the coupler nears the soil;

retracting the drive socket and grout tube from engagement with the coupler and the grout plug assembly;

removing the grout plug assembly from the threaded engagement with the upper receiving feature of the coupler while the coupler is disposed above the soil; and coupling a threaded bottom end of an overhead pipe pile segment in threaded engagement.

10. The method of claim 9, wherein the subtending pipe pile segment comprises a bottom pipe pile segment in the pipe assembly, the subtending pipe pile segment comprising a soil-penetrating tip and a helical flange extending outward from the axis, wherein the method further comprises urging the subtending pipe pile segment downward in response to rotation of the helical flange within the soil.

11. The method of claim 9, wherein the lower receiving feature comprises a lower smooth bore, wherein coupling the top end to the coupler comprises sliding a smooth exterior surface of the top end of the subtending pipe pile segment into the lower smooth bore.

12. The method of claim 9, wherein the lower receiving feature comprises a lower threaded bore, wherein coupling the top end to the coupler comprises threading a threaded exterior surface of the top end of the subtending pipe pile segment into the lower threaded bore.

13. The method of claim 9, wherein after rotation of the subtending pipe pile segment the method further comprises the steps of:

removing the second flange from the drive socket; and after removing the second flange from the drive socket, removing the first flange from the drive socket.

14. The method of claim 13, wherein the upper receiving feature further comprises a lead-in portion above the upper threaded bore, wherein the lead-in portion comprises an upper smooth bore having a length along the axis that is equal to or greater than a length along the axis of two threads of the upper receiving feature, the method further comprising, prior to threading the threads of the overhead pipe pile segment into the upper receiving feature, inserting the overhead pipe pile segment into the upper smooth bore.

15. The method of claim 13, wherein the interior surface further comprises a stop feature, wherein threading the overhead pipe pile segment into the upper receiving feature comprises abutting the stop feature with the overhead pipe pile segment to prevent insertion of the overhead pipe pile segment beyond a lower boundary of the upper receiving feature.

16. A system for penetrating soil with a pipe assembly and for introducing a liquid or slurry into the pipe pile assembly during soil penetration, the system comprising:

a subtending pipe pile segment comprising a top end;

an overhead pipe pile segment comprising a threaded bottom end;

a drive socket;

a grout tube;

a drive motor assembly coupled to the drive socket to urge rotation of the drive socket;

a grout plug assembly having threads; and a coupler comprising:

a body having a generally tubular shape having an axis, the body comprising an exterior surface and an interior surface, the interior surface comprising a lower receiving feature and an upper receiving feature, the upper receiving feature having threads;

a first flange secured to the exterior surface, wherein the first flange extends generally perpendicular to the axis, the first flange having a first noncircular shape; and a second flange secured to the exterior surface, wherein the second flange extends generally perpendicular to the axis, the second flange having a second shape;

wherein the lower receiving feature is shaped to receive the top end of the subtending pipe pile segment;

wherein the upper receiving feature receives the grout plug assembly and the threaded bottom end of the overhead pipe pile segment selectively in threaded engagement, the grout plug assembly receives the grout tube in a sealed engagement and is removable from the upper receiving feature while disposed above the soil;

wherein the first and second flanges are spaced apart from each other;

wherein the drive socket is shaped to receive the first flange and the second flange such that rotation of the drive socket is transmitted to the body through at least one of the first and second flanges.

17. The system of claim 16, wherein the subtending pipe pile segment comprises a bottom pipe segment in a pipe assembly, the subtending pipe pile segment comprising a soil-penetrating tip and a helical flange extending outward from the axis to urge the subtending pipe pile segment downward in response to rotation of the helical flange within the soil.

18. The system of claim 16, wherein the upper receiving feature comprises an upper threaded bore shaped to receive the threaded bottom end of the overhead pipe pile segment.

19. The system of claim 18, wherein the upper receiving feature further comprises a lead-in portion above the upper threaded bore, wherein the lead-in portion comprises an upper smooth bore having a length along the axis that is equal to or greater than a length along the axis of two threads of the upper threaded bore.

20. The system of claim 18, wherein the interior surface further comprises a stop feature positioned to prevent insertion of the threaded bottom end of the overhead pipe pile segment and the grout plug assembly beyond a lower boundary of the upper receiving feature.

* * * * *